US011163097B1

(12) United States Patent
Brailovskiy et al.

(10) Patent No.: US 11,163,097 B1
(45) Date of Patent: Nov. 2, 2021

(54) DETECTION AND CORRECTION OF OPTICAL FILTER POSITION IN A CAMERA DEVICE

(71) Applicant: Amazon Technologies, Inc., Seattle, WA (US)

(72) Inventors: Ilya Brailovskiy, Los Gatos, CA (US); Gordon McLean Downie, Cambridge (GB); Qi Keith Wang, Cambridge (GB); Alessio Carosi, Waterbeach (GB)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 16/517,333

(22) Filed: Jul. 19, 2019

(51) Int. Cl.
*G03B 7/18* (2021.01)
*G02B 5/20* (2006.01)
*G02B 5/28* (2006.01)
*H04N 5/33* (2006.01)
*G02F 1/01* (2006.01)

(52) U.S. Cl.
CPC .............. *G02B 5/201* (2013.01); *G02B 5/208* (2013.01); *G02B 5/281* (2013.01); *G03B 7/18* (2013.01); *H04N 5/33* (2013.01); *G02F 1/0147* (2013.01)

(58) Field of Classification Search
CPC ........ G02B 5/201; G02B 5/208; G02B 5/281; G03B 7/18; H04N 5/33; G02F 1/0147
See application file for complete search history.

(56) References Cited

U.S. PATENT DOCUMENTS

| 10,178,324 | B2* | 1/2019 | Niida | H04N 5/2351 |
| 2020/0336677 | A1* | 10/2020 | Numata | H04N 5/2251 |

\* cited by examiner

*Primary Examiner* — Twyler L Haskins
*Assistant Examiner* — Angel L Garces-Rivera
(74) *Attorney, Agent, or Firm* — Greenberg Traurig, LLP

(57) ABSTRACT

An embodiment of a camera device may include an optical filter. The camera device may attempt to actuate the optical filter from an inactive position to an active position, record video, count a quantity of pixels, and/or a quantity of lines of pixels, in one or more frames of the video that are a color that is characteristic of the absence of the optical filter, determine that the quantity is greater than a threshold, and again attempt to move the optical filter to its active position.

20 Claims, 14 Drawing Sheets

DETECTION AND CORRECTION OF OPTICAL FILTER POSITION IN A CAMERA DEVICE

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present detection and correction of optical filter position in an A/V device now will be discussed in detail with an emphasis on highlighting the advantageous features. These embodiments depict the novel and non-obvious detection and correction of optical filter position in an A/V device shown in the accompanying drawings, which are for illustrative purposes only. These drawings include the following figures, in which like numerals indicate like parts.

DETAILED DESCRIPTION

Figure 1A:
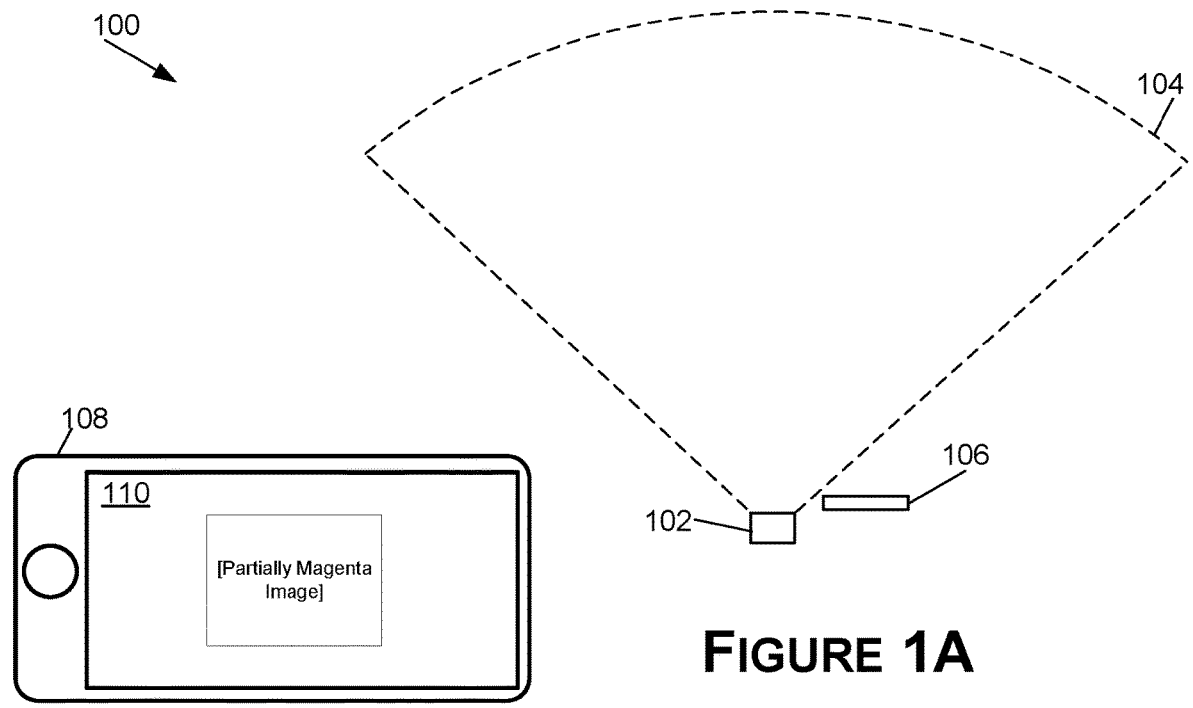
FIG. 1A is a schematic diagram of an example of a portion of an audio/video (A/V) recording and communication device system, according to various aspects of the present disclosure.

An A/V recording and communication device ("A/V device" or "camera device") may include an optical filter for absorbing/blocking/reflecting certain wavelengths of light from reaching its image sensor. For example, the A/V device may include an infrared (IR) cut filter to filter out IR and near-IR light, which light may cause captured images to be tinted red, pink, or magenta during the day, as perceived by human eyesight. However, IR and near-IR light may be useful for capturing images in low-light conditions (e.g., at night), so actuating the IR cut filter between a first, "inactive" position in which IR and near-IR light reach the image sensor and a second, "active" position in which IR and near-IR light are filtered out may be desirable.

Like any actuator, an actuator for an optical filter may become stuck or may otherwise not move the IR filter when movement is expected. In some embodiments, a position sensor may be placed directly on the optical filter or on the actuator to detect its position. In other embodiments, for simplicity of manufacturing, a position sensor may not be provided, but the image data produced by the camera with which the optical filter is associated may be analyzed to determine if the optical filter is in the expected position (e.g., for an IR cut filter, active during daylight conditions, and inactive during low light conditions).

Where the A/V device includes an IR cut filter, for example, the IR cut filter being in its inactive position during daytime may result in a red-, pink-, or magenta-tinted image. Accordingly, image data produced by the A/V recording the communication device may be analyzed by the A/V device or another computing device to determine if an unexpected amount of pink, red, or magenta color appears in the image data. For example, a quantity or percentage of pink, red, or magenta pixels may be counted in one or more image frames and compared to a threshold, in some embodiments. Additionally, or alternatively, a quantity of pink, red, or magenta lines may be counted in one or more image frames and compared to a threshold. If the quantity of red, pink, or magenta pixels or lines in the image frame exceeds the threshold, the A/V recording and communication device may attempt to actuate the IR cut filter to its active position. In various embodiments, the lines may correspond to rows of pixels and/or columns of pixels. In some embodiments, the A/V recording and communication device may iteratively analyze its frames for red, pink, or magenta and attempt to actuate the IR cut filter until excess red, pink, or magenta is no longer detected, or until the number of attempts exceeds a threshold, at which time a user may be notified that the IR cut filter cannot actuate.

Where the A/V device includes IR illumination (e.g., IR LEDs) for "night vision," the IR cut filter being in its active position during nighttime may result in a black image. In night vision mode, the A/V device may rely primarily upon IR light (which the A/V device may output for reflection from objects in the field of view of a camera of the A/V device) to create an image. Accordingly, the IR cut filter—which may block IR and near-IR light—being in an active position may result in a lack of useful light reaching the image sensor of the A/V device during night vision mode. Accordingly, in order to determine if the IR cut filter is improperly in the active position during night vision mode, image data produced by the A/V recording the communication device may be analyzed by the A/V device and/or another computing device to determine if an unexpected amount of black color appears in the image data. For example, a quantity of black pixels may be counted in one or more image frames and compared to a threshold, in some embodiments. Additionally, or alternatively, a quantity of black lines may be counted in one or more image frames and compared to a threshold. If the quantity of black pixels or black lines in the image frame exceeds the threshold, the A/V device may attempt to actuate the IR cut filter to its inactive position. In various embodiments, the lines may correspond to rows of pixels and/or columns of pixels. In some embodiments, the A/V device may iteratively analyze its image frames for black pixels and/or black lines and attempt to actuate the IR cut filter until excess black is no longer detected, or until the number of attempts exceeds a threshold, at which time a user may be notified that the IR cut filter cannot actuate.

Although the disclosure above and below uses an IR cut filter as an example filter in an A/V recording and communication device, the present disclosure may find use with filters that block other wavelengths of light. Accordingly, an A/V device or other electronic device according to the present disclosure may be configured to analyze the image data captured by the camera for an excess of a color that is within or adjacent to a wavelength range that is filtered by the optical filter. Such a color may be referred to herein as a "target color."

The remaining detailed description describes the present embodiments with reference to the drawings. In the drawings, reference numbers label elements of the present embodiments. These reference numbers are reproduced below in connection with the discussion of the corresponding drawing features.

Figure 1B:
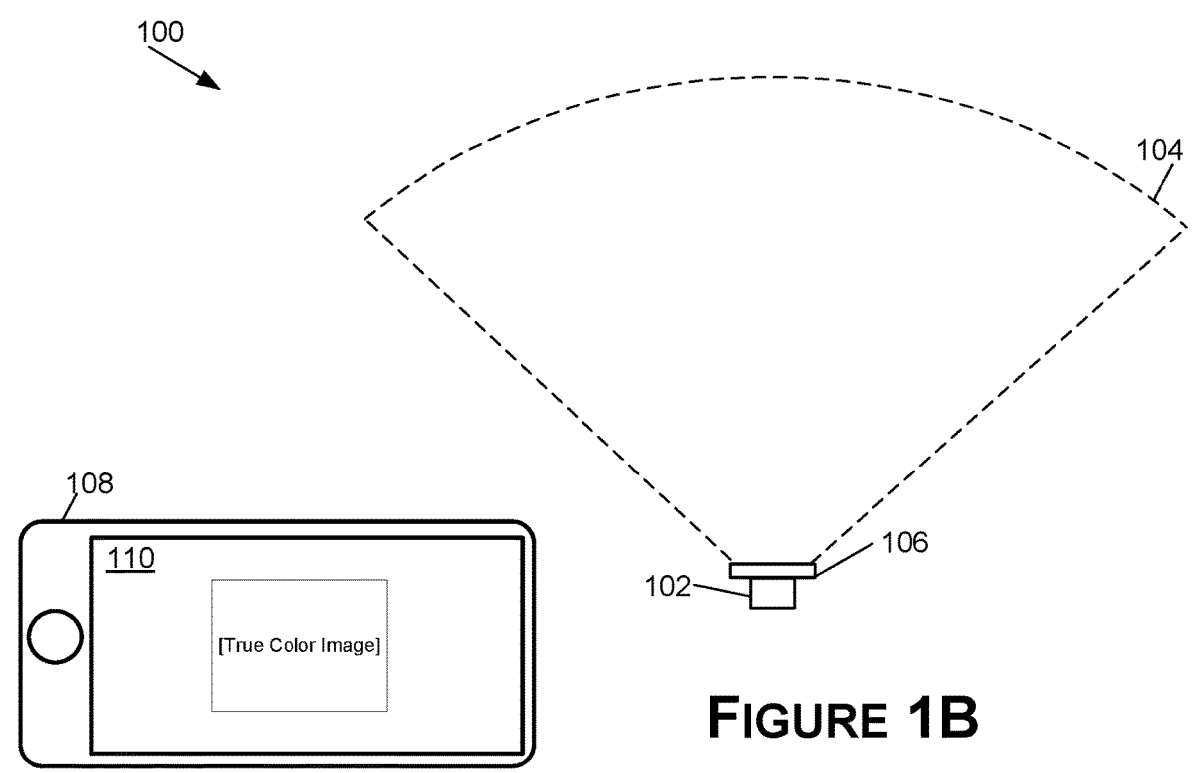
FIG. 1B is a schematic diagram of an example of a portion of an audio/video (A/V) recording and communication device system, according to various aspects of the present disclosure.

FIGS. 1A and 1B are schematic diagrams of an example of a portion 100 of an A/V recording and communication device system, according to various aspects of the present disclosure. The system portion 100 includes a camera 102 of an A/V recording and communication device, the camera having a field of view 104, and an IR cut filter 106 that is movable between a first position (illustrated schematically in FIG. 1A) and a second position (illustrated schematically in FIG. 1B). The camera 102 may capture video of its field of view 104, which video may be transmitted to a user client device 108 via one or more servers and networks (not shown in FIGS. 1A and 1B; see FIG. 2) and displayed on a display 110 of the user client device 108. As illustrated in FIG. 1A, with the IR cut filter in a first, inactive position in which it is not located before an image sensor of the camera 102, and does not block IR and near-IR light from the image sensor of the camera 102, the image displayed on the user client device display 110 may be magenta-tinted or may otherwise be partially magenta during daylight conditions. In contrast, as illustrated in FIG. 1B, with the IR cut filter 106 in a second, active position in which it is located before the image sensor of the camera 102, and does block IR and near-IR light from the image sensor of the camera 102, the image displayed on the user client device display 110 may be a true color image (e.g., an image as would be perceived by human sight) during daylight conditions. Consequently, proper actuation of, and detection of the position of, the IR cut filter 106 is significant to the operation of the A/V recording and communication device, and to the quality of image and video received by the user client device 108.

Conversely, the configuration of FIG. 1A, with the IR cut filter in a first, inactive position in which it is not located before an image sensor of the camera 102, and does not block IR and near-IR light from the image sensor of the camera 102, may result in a proper image during a night vision mode of operation of the camera 102. In contrast, the configuration illustrated in FIG. 1B, with the IR cut filter 106 in a second, active position in which it is located before the image sensor of the camera 102, and does block IR and near-IR light from the image sensor of the camera 102, may result in a black image during the night vision mode.

Although the IR cut filter 106 is illustrated in FIGS. 1A and 1B as separate from the A/V recording and communication device 102, the IR cut filter 106 or other optical filter may be integrated into the A/V and recording and communication device 102, in some embodiments. For example, the IR cut filter 106 or other optical filter may be configured to be movably disposed between a lens and an image detector of the A/V recording and communication device 102, in embodiments. The IR cut filter 106 or other optical filter may thus be disposed within a housing or case of the A/V recording and communication device 102, in embodiments.

Figure 2:
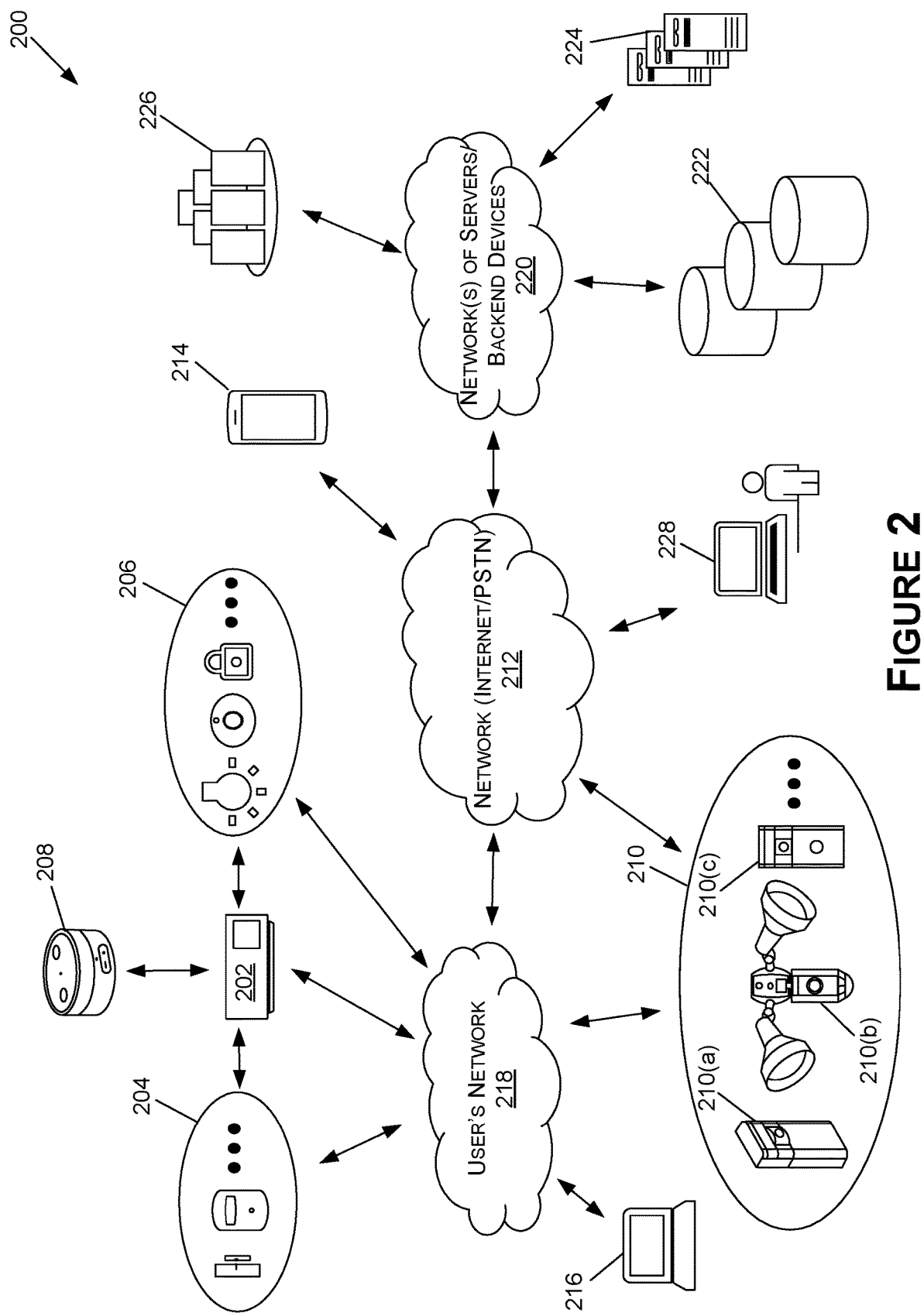
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212, may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, a communication hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively referred to herein as "A/V devices 210" or "A/V device 210") (which may be similar to the A/V device 102 described with respect to FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a hub device 202 connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at a location, such as a property, building, home, business, or premises for the purpose of securing and/or automating all or a portion of the location.

The system 200 may further include one or more client devices 214, 216 (which may represent, and/or be similar to, the client device 108 of FIG. 1). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (which may be referred to interchangeably as "cloud storage device(s)"), one or more servers 224, and one or more backend application programming interfaces (APIs) 226. While FIG. 2 illustrates the storage device 222, the server 224, and the API 226 as components separate from the network 220, it is to be understood that the storage device 222, the server 224, and/or the API 226 may be considered to be components of the network 220. For example, the network 220 may include a data center with a plurality of computing resources used to implement the storage device 222, the server 224, and the API 226.

The server 224 may comprise a computer program or other computer executable code that, when executed by processor(s) of the server 224, causes the server 224 to wait for requests from other computer systems or software (clients) and provide responses. In an embodiment, the server 224 shares data and/or hardware and/or software resources among the client devices 214, 216. This architecture is called the client-server model. The client devices 214, 216 may run on the same computer or may connect to the server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The API 226 may comprise, for example, a server (e.g. a real server, or a virtual machine, or a machine running in a cloud infrastructure as a service), or multiple servers networked together, exposing at least one API to clients. In various embodiments, the API 226 is provided by servers including various components such as an application server (e.g. software servers), a caching layer, a database layer, or other components suitable for implementing one or more APIs. The API 226 may, for example, comprise a plurality of applications, each of which communicate with one another using one or more public APIs. In some embodiments, the API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatMl, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the server 224, the API 226, the storage devices 222, etc.) may be referred to herein as a "network device" or "network devices."

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control its own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of servers/backend devices 220).

As will be described in greater detail below, any of the A/V devices 210, the hub device 202, the VA device 208, the automation devices 206, the client devices 214, 216, and/or the API 226 may perform the target color detection and filter actuation instruction functionality, and notification generation and transmission functionality disclosed herein.

Figure 3:
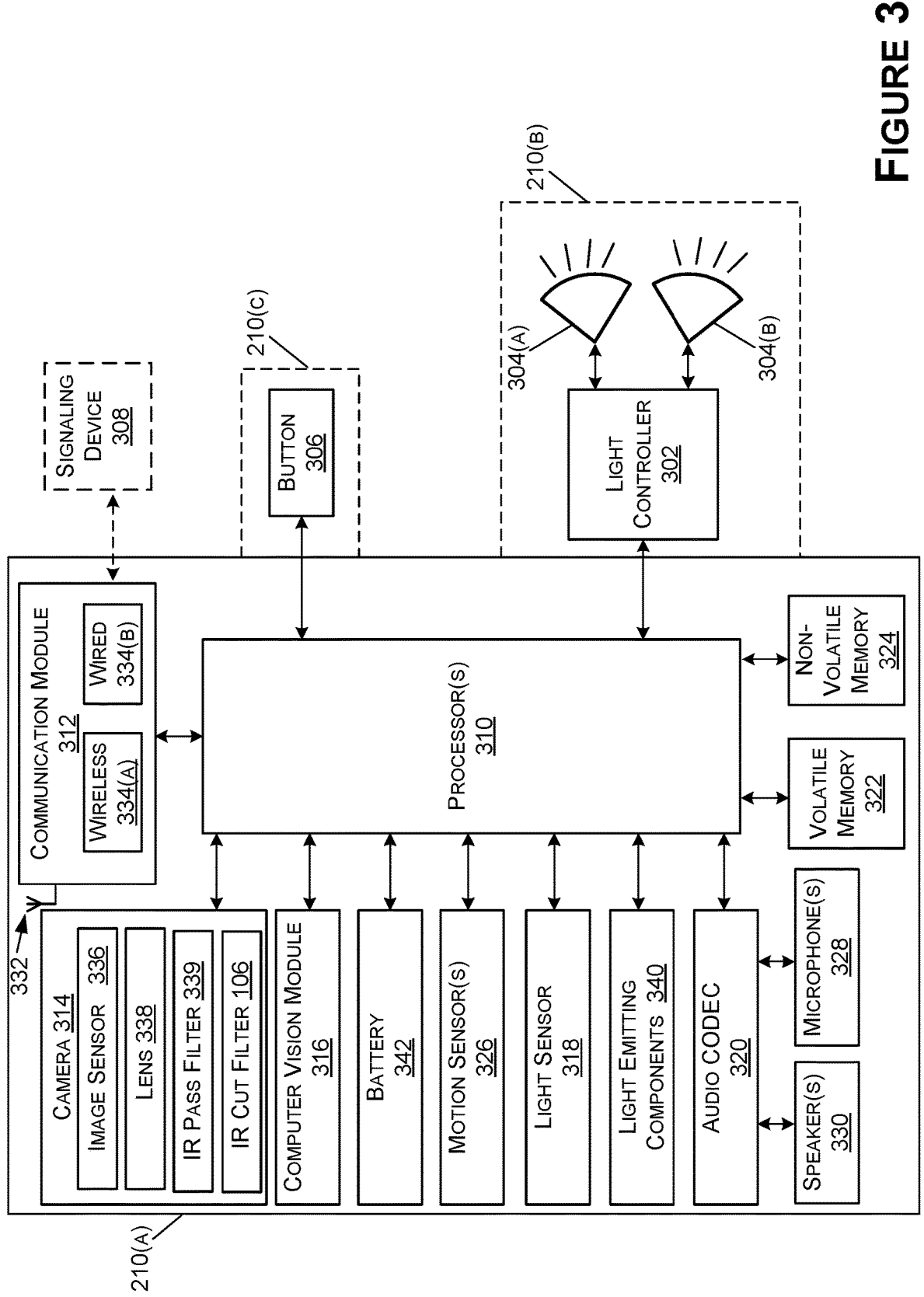
FIG. 3 is a functional block diagram of an A/V recording and communication device according to various aspects of the present disclosure.

FIG. 3 is a functional block diagram for an audio/video recording and communication device ("A/V device" or "camera device") according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include one or more processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, including client device 214, 216 and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(a) and wired 334(b) adapters. For example, the communication module 312 may include one or more wireless antennas, radios, receivers, transmitters, and/or transceivers (not shown in FIG. 3 for simplicity)

configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(c) is pressed, the communication module 312 may be triggered to perform one or more functions, such as to transmit a signal over the wired 334(b) connection to the signaling device 308 (although, in some embodiments, the signal may be transmitted over a wireless 334(a) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336 and a lens 338. The lens 338 and image sensor 336 may be arranged such that light passes through and is focused by the lens 338 onto the image sensor 336. The image sensor 336 may include a video recording sensor and/or a camera chip. In one aspect of the present disclosure, the image sensor 336 may comprise a complementary metal-oxide semiconductor (CMOS) array and may be capable of recording high definition (e.g., 720p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SDRAM).

The camera 314 may further include an IR pass filter 339 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR pass filter 339 may enable the image sensor 336 to see this infrared light as it is reflected or refracted off of objects within the field of view of the doorbell. This process may provide the A/V device with the "night vision" function mentioned above.

The camera 314 may further include an IR cut filter 106 that is configured to be movably disposed before the image sensor 336, such as between the lens 338 and the image sensor 336. In its first, inactive position, the IR cut filter 106 may not be disposed between the lens 338 and the image sensor 336 and consequently may not block IR and near-IR light from reaching the image sensor 336. In its second, active position, the IR cut filter 106 may be disposed between the lens 338 and the image sensor 336, the IR cut filter may block IR and near-IR light from reaching the image sensor 336. The IR cut filter 106 may include an optical filter element that filters light and an actuator that is configured to move the optical filter element between its first and second positions responsive to commands from the processor 310.

Figure 8A:
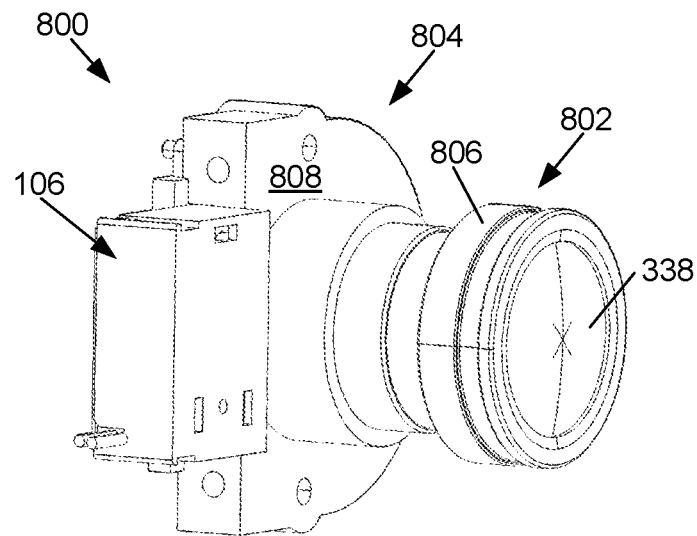
FIGS. 8A and 8B are isometric views of one example embodiment of a lens and optical filter assembly, according to various aspects of the present disclosure.
Figure 8B:
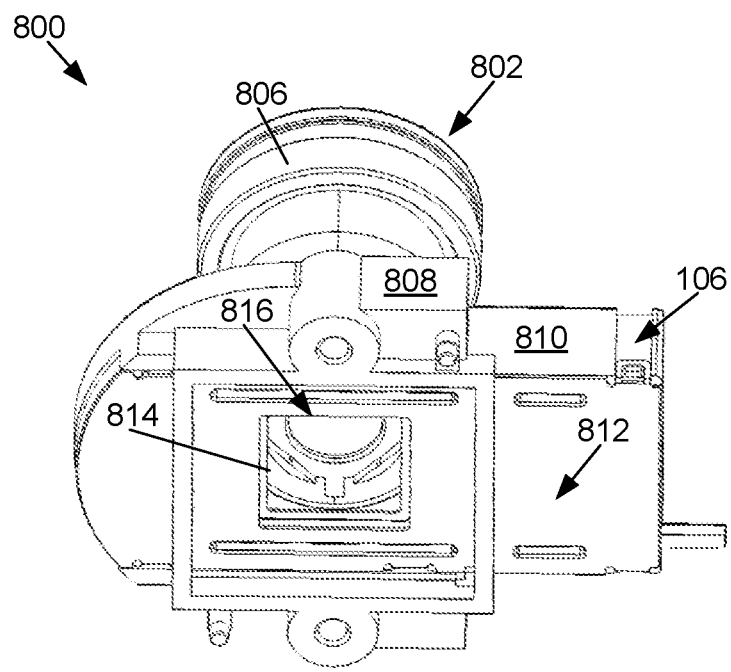
Figure 8C:
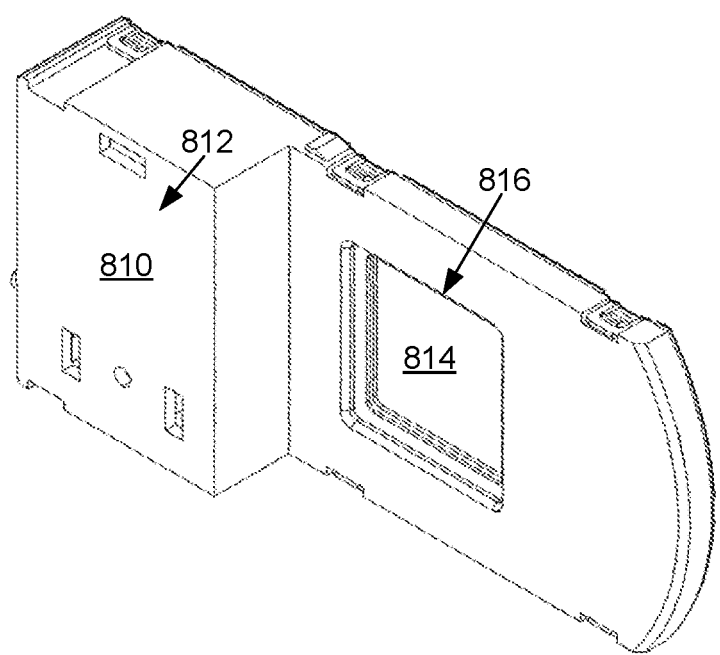
FIG. 8C is an isometric view of a portion of the assembly of FIGS. 8A and 8B, according to various aspects of the present disclosure.

FIGS. 8A and 8B are isometric views of an example embodiment of an assembly 800 including a lens and an IR cut filter assembly. FIG. 8C is an isometric view of an example embodiment of an IR cut filter 106. Referring to FIGS. 8A, 8B, and 8C, the assembly 800 includes a lens assembly 802 and an optical filter assembly 804. The lens assembly 802 may include a lens 338 mechanically coupled to and secured by a lens housing 806. The optical filter assembly 804 may include an optical filter coupler 808 and the IR cut filter 106. The optical filter coupler 808 may mechanically secure the IR cut filter 106 to the lens assembly 802.

As best shown in FIGS. 8B and 8C, the IR cut filter 106 may include a housing 810, an actuator 812, and an optical filter element 814. The actuator 812 may be disposed within the housing 810 and may be configured to, responsive to commands (e.g., commands from the processor 310 of the A/V device 210), move the optical filter element 814 between a first, inactive position in which the optical filter element 814 is disposed within the housing 810 and a second, active position in which the optical filter element is disposed within a window 816. When disposed within the window 816, the optical filter element 814 may be disposed between the lens 338 and the image sensor 336 of the A/V device 210 (that is, may be disposed before the image sensor 336 and in a light path as that light travels from the lens 338 to the image sensor 336 of the A/V device 210). The actuator 812 may be an electromechanical actuator, in some embodiments, though any appropriate type of actuator may be used, in various embodiments.

The filter element 814 may be or may include a material that selectively blocks (e.g., absorbs or reflects) infrared and/or near-infrared light, while passing other light wavelengths, in some embodiments. For example, the filter element 814 may include an optical glass that absorbs IR and/or near-IR light. Additionally, or alternatively, the filter element 814 may include an interference filter element that reflects IR and/or near-IR light.

This disclosure makes reference to movement of the IR cut filter 106 or other optical filter between a first, inactive position and a second, active position. It should be understood that, in the example IR cut filter 106 illustrated in FIGS. 8A. 8B, and 8C, actuation by the actuator 812 of the optical filter element 814 is an example of such movement between the first and second positions.

With further reference to FIG. 3, the A/V recording and communication device 210 may comprise the light sensor 318 and the one or more light-emitting components 340, such as LED's. The light sensor 318 may be one or more sensors capable of detecting the level of ambient light of the surrounding environment in which the A/V device 210 may be located. The light sensor 318 may output a lux value, in some embodiments. The level of ambient light detected by the light sensor 318 may be used by the A/V device 210 to determine a position of the IR cut filter 106, in some embodiments (e.g., using the processes 900, 1000 of FIGS. 9 and 10). The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the server 224 and/or the API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not to be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively separate from, other motion sensor(s) 326. For example, the CVM 316 may be a low-power CVM (e.g., Qualcomm Glance®) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternatively separate from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to ensure that it satisfies certain assumptions implied by the method. Examples of pre-processing include, but are not limited to re-sampling in order to ensure that the image coordinate system is correct, noise reduction in order to ensure that sensor noise does not introduce false information, contrast enhancement to ensure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object. Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many core DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and to enable face detection and recognition.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motion sensor(s) 326 and/or the camera 314 detecting motion, the light controller 302 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to begin recording the image data, and the microphone(s) 328 to begin recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more components of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
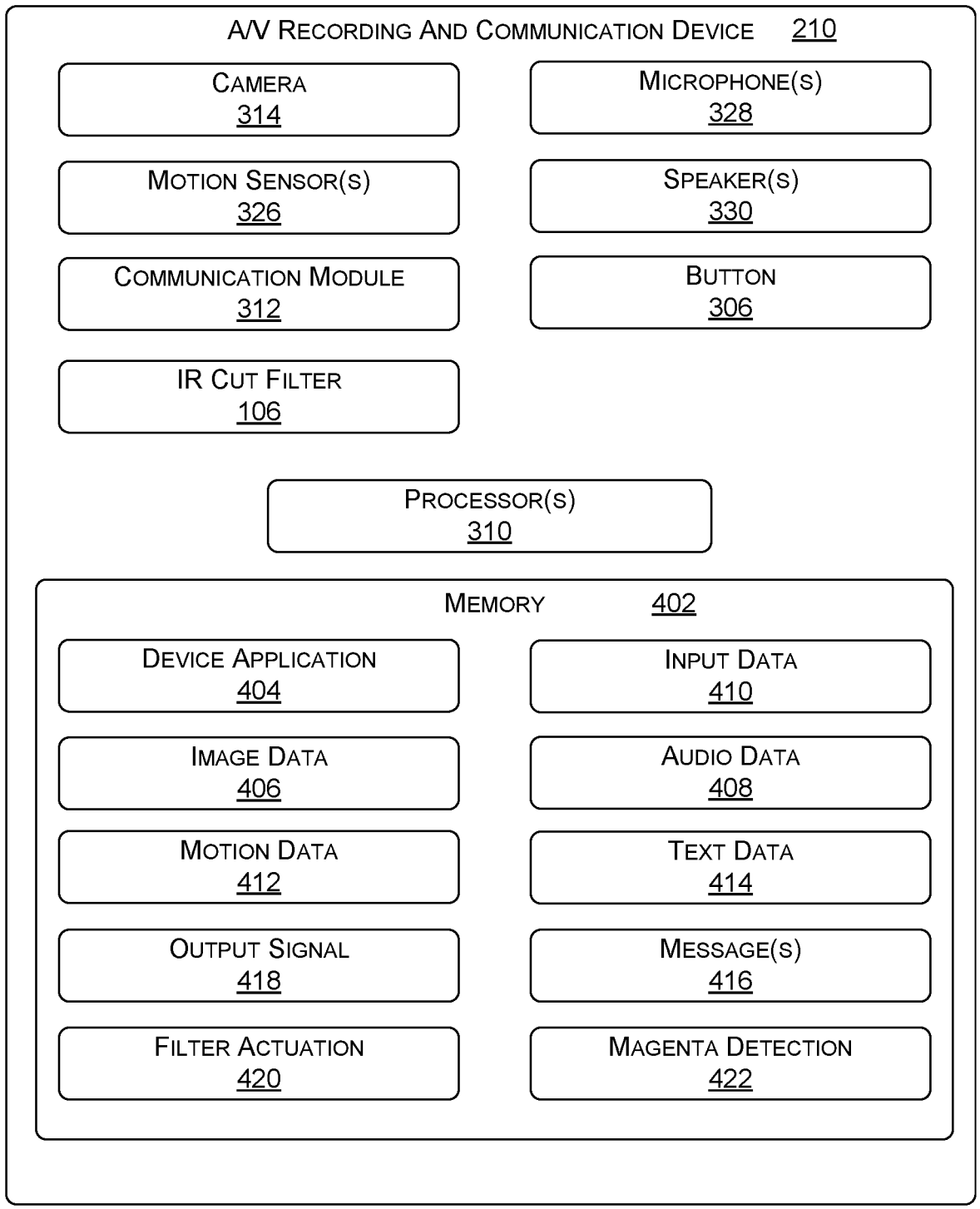
FIG. 4 is a functional block diagram illustrating one example embodiment of an A/V recording and communication device according to various aspects of the present disclosure.

FIG. 4 is another functional block diagram illustrating an embodiment of the A/V device 210 according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4. The A/V device 210, which includes a camera and other components, may be referred to as a "camera device."

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the server 224 and/or the hub device 202 using the communication module 312. The server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the server 224, and the server 224 may then transmit (or forward) the output signal 418 to the client device(s) 214, 216. In other embodiments, the output signal 418 may be transmitted directly to the client device(s) 214, 216 by the A/V device 210.

With further reference to FIG. 4, the image data 406 may comprise image sensor data such as (but not limited to) exposure values and data regarding pixel values for a particular sized grid having a plurality of rows and a plurality of columns for each of one or more image frames (e.g., a plurality of image frames). Such pixel values may include, in some embodiments, a three-part value respective of each pixel, such as a luma value and first and second chromaticity values, such as are included in a YUV value set. "YUV" is used in this disclosure to refer to digitally-encoded values, which may also be referred to as Y'UV values. Additionally, or alternatively, the pixel values may include RGB values. An RGB value for a pixel may include chromaticity values for red, blue, and green components, as is known in the art. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412. In some embodiments, a message 416 may include a notification intended for a user to inform the user that an IR cut filter 106 or other optical filter cannot be actuated, a notification including instructions for the user to address an IR cut filter 106 or other optical filter that cannot be actuated, and/or a notification asking the user if the effects of an optical filter that cannot be actuated (e.g., a magenta-tinted image, in the example of an IR cut filter 106) are apparent to the user. If the user answers such a notification in the affirmative, a notification including instructions for addressing the optical filter that cannot be actuated may be transmitted to the user.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia service (MMS) messages, voicemail messages, video signals, audio signals, data transmissions, and/or any other type of electronic communication that an electronic device can send to another electronic device. In some embodiments, the message(s) 416 may include one or more commands to move the IR cut filter 106 from its first position to its second position, or vice-versa.

The image data 406, the audio data 408, the text data 414, and/or the motion data 412 may be tagged (e.g., with a time stamp, based on clock data) and/or stored separately (e.g., on the server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

At least some of the processes of the server 224, the hub device 202, and/or the client device 214, 216 described herein may be executed by the A/V device 210. For example, the A/V device 210 may be configured to perform one or more processes to determine if an optical filter of the A/V device 210 is properly positioned (e.g., positioned so as to block one or more wavelength ranges of light, and pass other light wavelengths). As described in greater detail with respect to FIGS. 9 and 10, the A/V device 210 may include programming for determining, based on image data captured by the A/V device 210, whether the IR cut filter 106 or some other optical filter of the A/V device 210 is properly positioned (e.g., is in an active position during daytime or other relatively bright or high-intensity light conditions). For example, the A/V device 210 may include programming comprising a magenta detection process 422, through which the A/V device 210 may count a total quantity of pixels in one or more frames of recorded video that are magenta in order to determine if the IR cut filter 106 is properly positioned. The magenta detection process 422 may further calculate a percentage of pixels in one or more of the frames that are magenta by dividing the quantity of magenta pixels by the total number of pixels in the frame. The magenta detection process 422 may further calculate a quantity of pixels in one or more lines of one or more frames of the video that are magenta, designate a line as magenta when the quantity of magenta pixels is above a threshold, and calculate a quantity of lines that are magenta. The quantity of magenta pixels, percentage of magenta pixels, and quantity of magenta lines may be compared to respective thresholds. If the quantity or percentage of magenta pixels or the quantity of magenta lines is greater than its respective threshold, the A/V device 210 may conclude that the IR cut filter 106 is not in an active position (e.g., is not positioned so as to block IR and near-IR light from impinging on the image sensor 336). In response to determining that the quantity of magenta pixels, percentage of magenta pixels, or quantity of magenta lines is greater than its respective threshold, the A/V device 210 may attempt to move the IR cut filter 106 to an active position in which the IR cut filter 106 is positioned so as to block IR and near-IR light from impinging on the image sensor 336. For example, the processor 310 of the A/V device 210 may invoke an optical filter actuation process 420 to send an instruction to an actuator of the IR cut filter 106 to move an optical filter element of the IR cut filter 106 to the active position. The A/V device 210 may be configured to iteratively receive image data 406, analyze the image data for the presence of an excess of the target color, and attempt to move the IR cut filter 106 or other optical filter until the image data no longer contains an excess of the target color (e.g., magenta), thereby indicating that the optical filter has been actuated to its active position, or until the A/V device 210 has attempted to actuate the optical filter a sufficient number of times that it may be concluded that the optical filter will not actuate.

More generally, the A/V device 210 may be configured to count a quantity of pixels, and/or a quantity of lines, that are a color that is characteristic of the absence of the optical filter of the A/V device 210 to determine if that filter is positioned so as to filter out light from reaching the image sensor 336. In some embodiments, such a characteristic color may be a color that is within or adjacent to a wavelength range that is filtered out by the optical filter. For example, in the case of an IR cut filter, the A/V device may count a quantity of pixels, and/or a quantity of lines, that are red or a shade thereof (e.g., pink). Additionally, or alternatively, such a characteristic color may be a color that experimentation indicates is indicative of the absence of the optical filter. For example, in the case of an IR cut filter, the A/V device may count a quantity of pixels, and/or a quantity of lines, that are magenta. Accordingly, in the example above, magenta color may be examined to determine if an IR cut filter 106 is properly positioned; in other examples, and for other optical filters, other colors may be examined.

As noted above, in some embodiments, a magenta-tined image may be indicative of the absence of an IR cut filter. Such embodiments may include an image sensor of the camera that uses a Bayer filter, through which red-sensitive pixels may detect IR light, and thus the appearance of red in the image is increased. Such embodiments may further include image signal processing that includes color correction functionality in the camera that, responsive to the increase in red in the captured image, may attempt to correct the image color by increasing blue values. Accordingly, in such embodiments, exposure of the image sensor to IR light may lead to an increase of both red and blue in the captured image, which, combined, result in a magenta color in the captured image. In other embodiments that may use a filter other than a Bayer filter, and/or that use a different color correction approach (or do not use color correction), a color other than magenta may be induced by exposure to IR light, and thus a color other than magenta may be targeted to determine if the IR cut filter is properly positioned.

The A/V device 210 may also be configured to transmit, via the communication module 312, a notification that an optical filter of the A/V device 210 (e.g., the IR cut filter 106) cannot be actuated. In some embodiments, the A/V device 210 may transmit the notification to the server 224 or another network device, and the server 224 may then cause a notification to be transmitted to a user client device 214, 216. The notification may instruct the end user to perform a corrective action or to contact technical support associated with the A/V device 210, in some embodiments. Additionally, or alternatively, the notification may ask the user whether the images produced by the A/V device 210 appear to be magenta-tinted in nature, or tinted with another target color. If the user answers in the affirmative, the A/V device 210 may generate a notification instructing the end user to perform a corrective action or to contact technical support.

Figure 5:
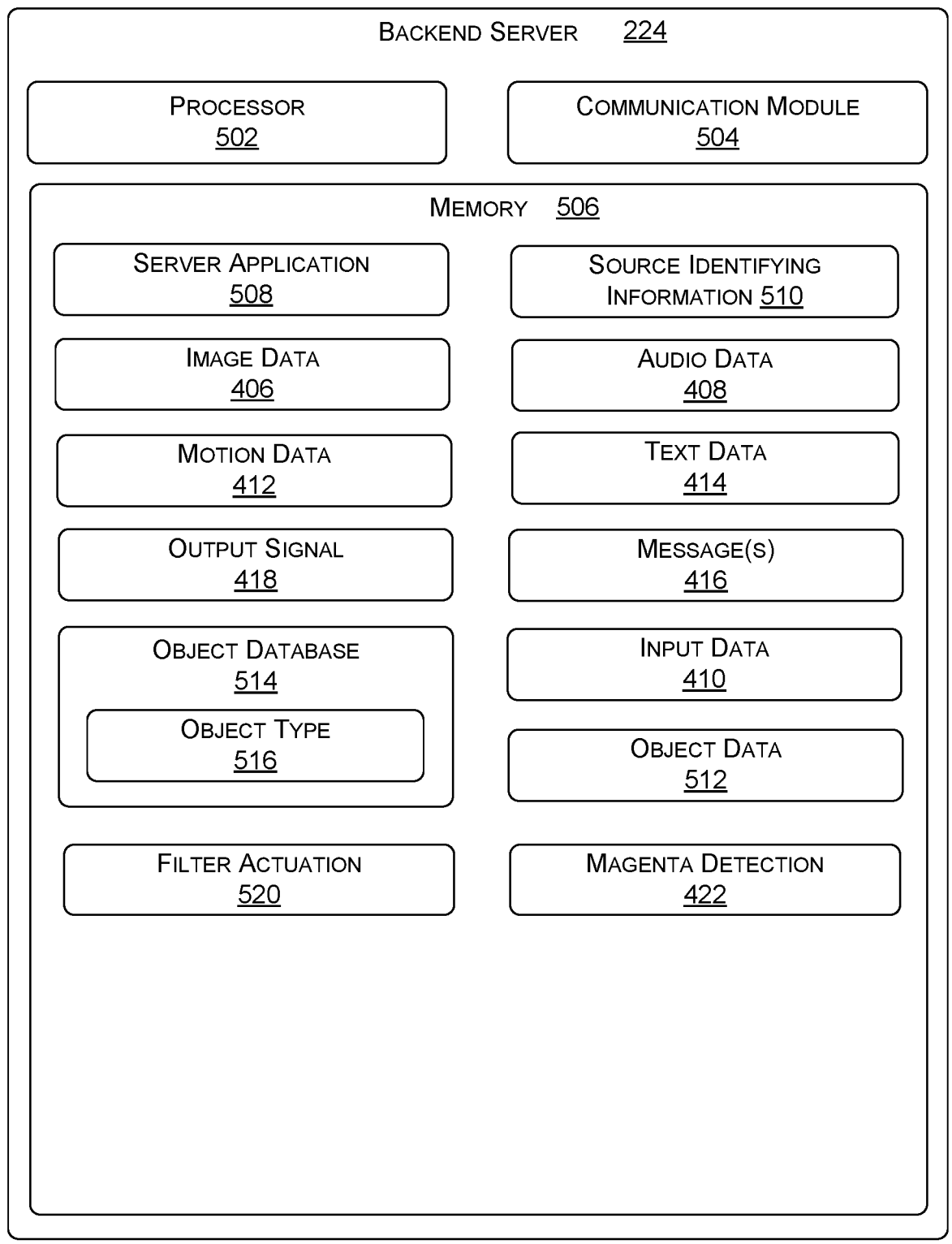
FIG. 5 is a functional block diagram illustrating one example embodiment of a backend device according to various aspects of the present disclosure.

FIG. 5 is a functional block diagram illustrating one embodiment of the server 224 according to various aspects of the present disclosure. The server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the server 224 to access and communicate with devices connected to the network (Internet/PSTN) 212 (e.g., the A/V device 210, the hub device 202, the client devices 214, 216, and/or a device controlled by the security monitoring service 228).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 230.

Although referred to as the server 224 with reference to the processes described herein, the server 224 may additionally, or alternatively, include one or more of the devices from the network(s) of servers/backend devices 220. For example, the processes described herein with respect to the server 224 may additionally, or alternatively, at least in part, be performed by one or more APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the server 224. For example, the server 224 may be configured to perform one or more processes to determine if an optical filter of the A/V device 210 is properly positioned (e.g., positioned so as to block a wavelength range of light, and pass other light wavelengths). As described in greater detail with respect to FIGS. 9 and 10, the server 224 may include programming for determining, based on image data 406 captured by and received from the A/V device 210, whether the IR cut filter 106 or some other optical filter of the A/V device 210 is properly positioned. For example, the server 224 may include programming comprising a magenta detection process 422, through which the server 224 may count a total quantity of pixels in one or more frames of video recorded by an A/V device 210 that are magenta in order to determine if the IR cut filter 106 of the A/V device 210 is properly positioned. The magenta detection process 422 may further calculate a percentage of pixels in one or more of the frames that are magenta by dividing the quantity of magenta pixels by the total number of pixels in the frame. The magenta detection process 422 may further (or alternatively) calculate a quantity of pixels in one or more lines of one or more frames of the video that are magenta, designate a line as magenta when the quantity of magenta pixels is above a threshold, and calculate a quantity of lines that are magenta. The quantity of magenta pixels, percentage of magenta pixels, and/or quantity of magenta lines may be compared to respective thresholds. If the quantity or percentage of magenta pixels and/or the quantity of magenta lines is greater than its respective threshold, the server 224 may conclude that the IR cut filter 106 of the A/V device 210 is not in an active position (e.g., is not positioned so as to block IR and near-IR light from impinging on the image sensor 336). In response to determining that the quantity of magenta pixels, percentage of magenta pixels, and/or quantity of magenta lines is greater than its respective threshold, the server 224 may invoke an optical filter actuation process 520 in which the server 224 may transmit an instruction to the A/V device 210 that causes the A/V device 210 to attempt to move the IR cut filter 106 to a position in which the IR cut filter 106 is positioned so as to block IR and near-IR light from impinging on the image sensor 336. The server 224 may be configured to iteratively receive image data 406, analyze the image data for the presence of an excess of the target color, and instruct the A/V device 210 to attempt to move the IR cut filter 106 or other optical filter until the image data no longer contains an excess of the target color (e.g., magenta), thereby indicating that the optical filter has been actuated to its active position, or until the A/V device 210 has attempted to actuate the optical filter a sufficient number of times that it may be concluded that the optical filter will not actuate.

More generally, the server 224 may count a quantity of pixels, and/or a quantity of lines, that are a color that is characteristic of the absence of the optical filter of the A/V device 210 to determine if that filter is positioned so as to filter out light from reaching the image sensor 336. In some embodiments, such a characteristic color may be a color that is within or adjacent to a wavelength range that is filtered out by the optical filter. For example, in the case of an IR cut filter, the server 224 may count a quantity of pixels, and/or a quantity of lines, that are red or a shade thereof (e.g., pink). Additionally, or alternatively, such a characteristic color may be a color that experimentation indicates is indicative of the absence of the optical filter. For example, in the case of an IR cut filter, the server 224 may count a quantity of pixels, and/or a quantity of lines, that are magenta. In the example above, magenta color may be examined to determine if an IR cut filter 106 is properly positioned; in other examples, and for other optical filters, other colors may be examined.

The server 224 may also be configured to transmit, via the communication module 504, a notification to a user client device 214, 216 that an optical filter of the A/V device 210 (e.g., the IR cut filter 106) cannot be actuated. In some embodiments, such a notification may be transmitted in response to the server 224 determining, based on the image data 406, that the optical filter cannot be actuated. In other embodiments, the notification may be transmitted by the backend sever 224 in response to a notification from the A/V device 210 that the optical filter cannot be actuated. The notification may instruct the end user to perform a corrective action or to contact technical support associated with the A/V device 210, in some embodiments. Additionally, or alternatively, the notification may ask the user whether the images produced by the A/V device 210 appear to be magenta-tinted in nature, or tinted with another target color.

In some embodiments, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the server 224 may analyze the image data 406 whenever the server 224 receives the image data 406 from the A/V device 210.

In some examples, to analyze the image data 406, computer vision processing and/or image processing, as described herein, for example, may be performed by the processor(s) 502 of the server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparison, the processor(s) 502 of the server 224 may match the object data 512 from the image data 406 to the image data stored in the object database 514. The processor(s) 502 of the server 224 may then use the match to determine that the object data 512 represents an object and/or to determine the type of object 516 that the object data 512 represents. For example, if the processor(s) 502 of the server 224 matches the object data 512 from the image data 406 to image data stored in the object database 514 that represents a person, then the processor(s) 502 of the server 224 may determine that the image data 406 depicts an object and/or that the image data 406 depicts a person. In some examples, when the object data 512 represents multiple objects, the processor(s) 502 of the server 224 may perform a similar analysis to identify each object represented by the object data 512 and/or the respective type of object 516 associated with each of the objects represented by the object data 512.

In some examples, in addition to, or alternatively separate from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the server 224, in some embodiments, the image data 406 may be analyzed by any of the A/V recording and communication device 210, the hub device 202, and/or the client device 214, 216 in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 512, as described with reference to FIG. 5.

The hub device 202 and/or the server 224 (and/or one or more additional or alternative components of the network(s) of servers/backend devices 220) may alternatively be referred to herein as "network devices."

Figure 6:
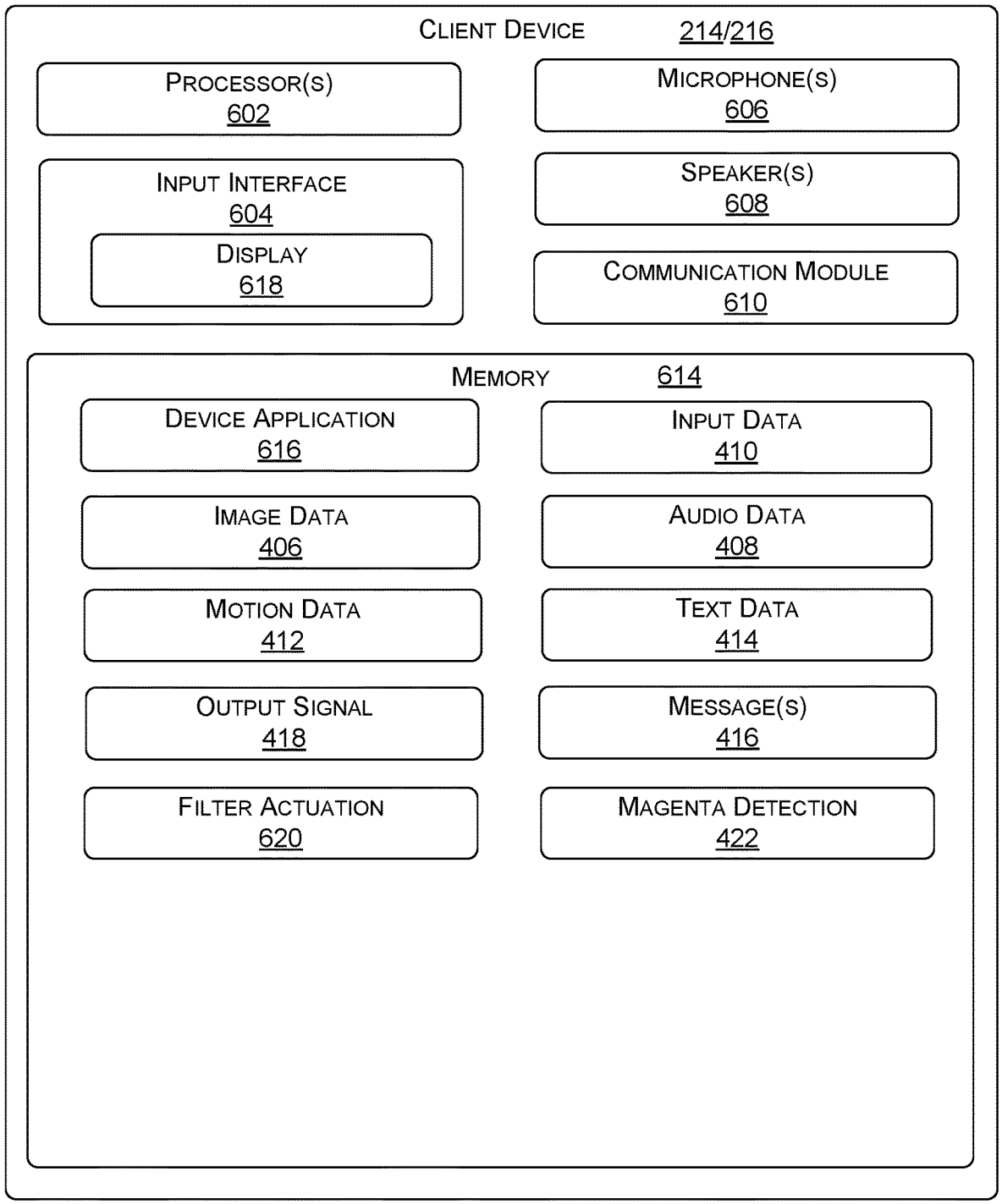
FIG. 6 is a functional block diagram illustrating one example embodiment of a client device according to various aspects of the present disclosure.

FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 614 may store a device application 616. In various embodiments, the device application 616 may configure the processor(s) 602 to receive input(s) to the input interface 604 (e.g., user responses to notifications regarding filter actuation). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the server 224.

With further reference to FIG. 6, the input interface 604 may include a display 618. The display 618 may include a touchscreen, such that the user of the client device 214, 216 may provide inputs directly to the display 618 (e.g., user responses to notifications regarding filter actuation). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 616 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 616 may configure the processor(s) 602 to display the received image data 406 on the display 618 (e.g., display image(s) and/or video footage represented by the image data 406).

As described herein, at least some of the processes of the A/V device 210, the hub device 202, and/or the server 224 may be executed by the client device 214, 216. For example, the client device 214, 216 may be configured to perform one or more processes to determine if an optical filter of the A/V device 210 is properly positioned (e.g., positioned so as to block a wavelength range of light, and pass other light wavelengths). As described in greater detail with respect to FIGS. 9 and 10, the client device 214, 216 may include programming for determining, based on image data 406 captured by and received from the A/V device 210, whether the IR cut filter 106 or some other optical filter of the A/V device 210 is properly positioned. For example, the client device 214, 216 may include programming comprising a magenta detection process 422, through which the client device 214, 216 may count a total quantity of pixels in one or more frames of video recorded by an A/V device 210 that are magenta in order to determine if the IR cut filter 106 of the A/V device 210 is properly positioned. The magenta detection process 422 may further calculate a percentage of pixels in one or more of the frames that are magenta by dividing the quantity of magenta pixels by the total number of pixels in the frame. The magenta detection process 422 may further (or alternatively) calculate a quantity of pixels in one or more lines of one or more frames of the video that are magenta, designate a line as magenta when the quantity of magenta pixels is above a threshold, and calculate a quantity of lines that are magenta. The quantity or magenta pixels, percentage of magenta pixels, and/or quantity of magenta lines may be compared to respective thresholds. If the quantity or percentage of magenta pixels and/or the quantity of magenta lines is greater than its respective threshold, the client device 214, 216 may conclude that the IR cut filter 106 of the A/V device 210 is not in an active position (e.g., is not positioned so as to block IR and near-IR light from impinging on the image sensor 336). In response to determining that the quantity of magenta pixels, percentage of magenta pixels, and/or quantity of magenta lines is greater than its respective threshold, the client device 214, 216 may invoke an optical filter actuation process 620 in which the client device 214, 216 may transmit an instruction to the A/V device 210 that causes the A/V device 210 to attempt to move the IR cut filter 106 to a position in which the IR cut filter 106 is positioned so as to block IR and near-IR light from impinging on the image sensor 336. The client device 214, 216 may be configured to iteratively receive image data 406, analyze the image data for the presence of an excess of the target color, and instruct the A/V device 210 to attempt to move the IR cut filter 106 or other optical filter until the image data no longer contains an excess of the target color (e.g., magenta), thereby indicating that the optical filter has been actuated to its active position, or until the A/V device 210 has attempted to actuate the optical filter a sufficient number of times that it may be concluded that the optical filter will not actuate.

More generally, the client device 214, 216 may count a quantity of pixels, and/or a quantity of lines, that are a color that is characteristic of the absence of the optical filter of the A/V device 210 to determine if that filter is positioned so as to filter out light from reaching the image sensor 336. In some embodiments, such a characteristic color may be a color that is within or adjacent to a wavelength range that is filtered out by the optical filter. For example, in the case of an IR cut filter, the client device 214, 216 may count a quantity of pixels, and/or a quantity of lines, that are red or a shade thereof (e.g., pink). Additionally, or alternatively, such a characteristic color may be a color that experimentation indicates is indicative of the absence of the optical filter. For example, in the case of an IR cut filter, the client device 214, 216 may count a quantity of pixels, and/or a quantity of lines, that are magenta. In the example above, magenta color may be examined to determine if an IR cut filter 106 is properly positioned; in other examples, and for other optical filters, other colors may be examined.

The client device 214, 216 may also be configured to output, via the display 618 and/or the speaker(s) 608, a notification to a user that an optical filter of the A/V device 210 (e.g., the IR cut filter 106) cannot be actuated. In some embodiments, such a notification may be output in response to the client device 214, 216 determining, based on the image data 406, that the optical filter cannot be actuated. In other embodiments, the notification may be output by the client device 214, 216 in response to a notification from the A/V device 210 or server 224 that the optical filter cannot be actuated. The notification may instruct the end user to perform a corrective action or to contact technical support associated with the A/V device 210, in some embodiments. Additionally, or alternatively, the notification may ask the user whether the images produced by the A/V device 210 appear to be magenta-tinted in nature, or tinted with another target color.

Figure 7:
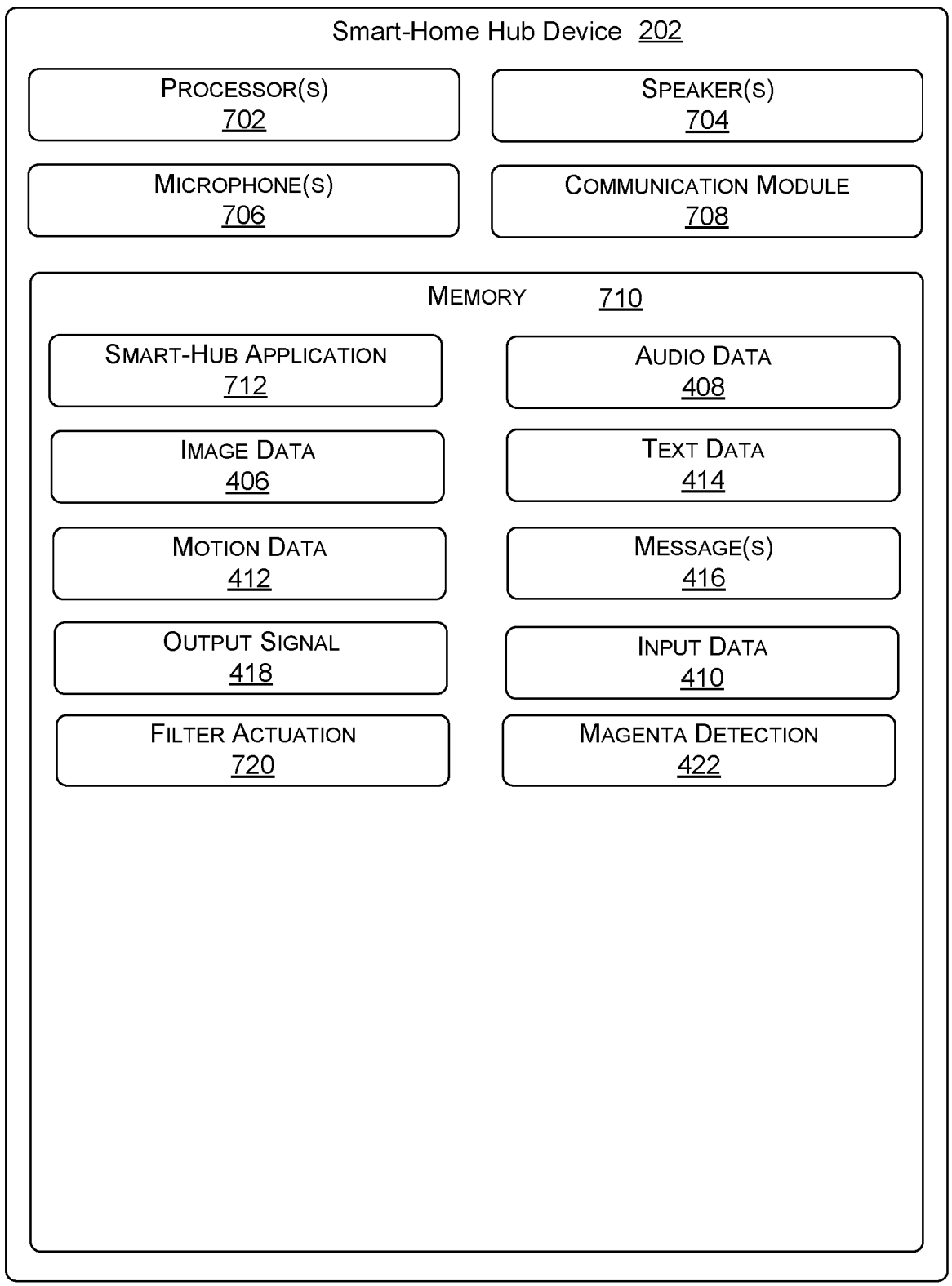
FIG. 7 is a functional block diagram illustrating one example embodiment of a smart-home hub device according to various aspects of the present disclosure.

FIG. 7 is a functional block diagram illustrating an embodiment of the smart-home hub device 202 according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more cameras (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the server 224, and/or an additional electronic device (e.g., a second A/V device 210, the automation device(s) 206, the sensor(s) 204, etc.).

As described herein, at least some of the processes of the A/V device 210, the server 224, and/or the client device 214, 216 may be executed by the hub device 202. For example, the hub device 202 may be configured to perform one or more processes to determine if an optical filter of the A/V device 210 is properly positioned (e.g., positioned so as to block a wavelength range of light, and pass other light wavelengths). As described in greater detail with respect to FIGS. 9 and 10, the hub device 202 may include programming for determining, based on image data 406 captured by and received from the A/V device 210, whether the IR cut filter 106 or some other optical filter of the A/V device 210 is properly positioned. For example, the hub device 202 may include programming comprising a magenta detection process 422, through which the hub device 202 may be configured to count a quantity of pixels in one or more frames of image data 406 that are magenta in order to determine if the IR cut filter 106 is properly positioned. If the quantity of magenta pixels is greater than a threshold, the hub device 202 may conclude that the IR cut filter 106 is not in an active position (e.g., is not positioned so as to block IR and near-IR light from impinging on the image sensor 336). In response to determining that the quantity of magenta pixels is greater than the threshold, the hub device 202 may invoke an optical filter actuation process 720 in which the hub device 202 may transmit an instruction to the A/V device 210 that causes the A/V device 210 to attempt to move the IR cut filter 106 to a position in which the IR cut filter 106 is positioned so as to block IR and near-IR light from impinging on the image sensor 336. The hub device 202 may be configured to iteratively receive image data 406, analyze the image data for the presence of an excess of the target color, and instruct the A/V device 210 to attempt to move the IR cut filter 106 or other optical filter until the image data no longer contains an excess of the target color (e.g., magenta), thereby indicating that the optical filter has been actuated to its active position, or until the A/V device 210 has attempted to actuate the optical filter a sufficient number of times that it may be concluded that the optical filter will not actuate.

More generally, the hub device 202 may be configured to count a quantity of pixels that are a color that is within or adjacent to a wavelength range that is filtered out by an optical filter of the A/V device 210 to determine if that filter is positioned so as to filter out light from reaching the image sensor 336. In the example above, magenta color may be examined to determine if an IR cut filter 106 is properly positioned; in other examples, and for other optical filters, other colors may be examined.

The hub device 202 may also be configured to transmit, via the communication module 708, a notification for a user client device 214, 216 that an optical filter of the A/V device 210 (e.g., the IR cut filter 106) cannot be actuated. In some embodiments, the hub device 202 may transmit the notification to the server 224, and the server 224 may then cause a notification to be transmitted to a user client device 214, 216. In some embodiments, such a notification may be transmitted in response to the hub device 202 determining, based on the image data 406, that the optical filter cannot be actuated. In other embodiments, the notification may be transmitted by the hub device 202 in response to a notification from the A/V device 210 that the optical filter cannot be actuated. The notification may instruct the end user to perform a corrective action or to contact technical support associated with the A/V device 210, in some embodiments. Additionally, or alternatively, the notification may ask the user whether the images produced by the A/V device 210 appear to be magenta-tinted in nature, or tinted with another target color.

Each of the processes described herein, including the processes 900 and 1000, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 9:
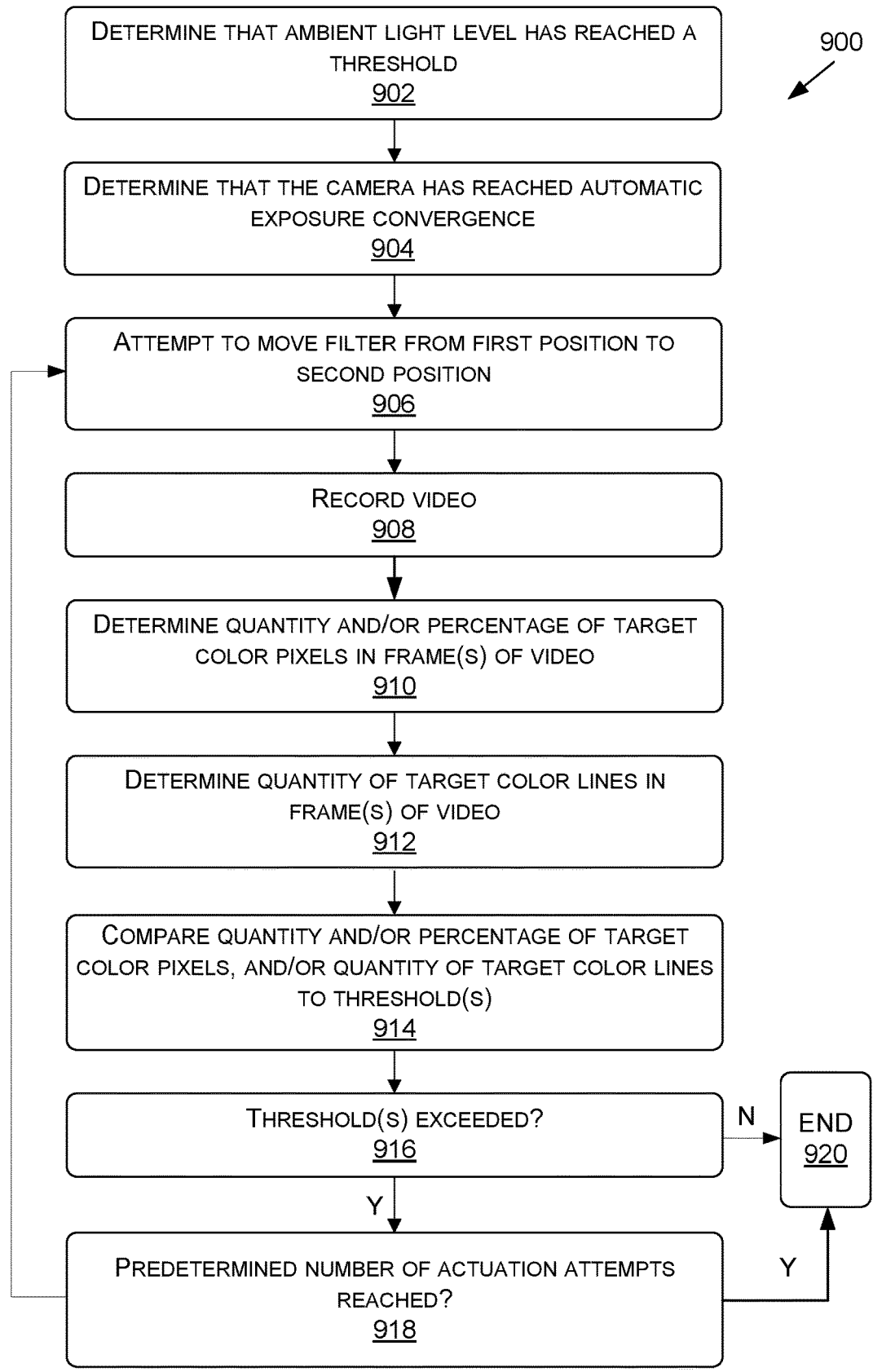
FIG. 9 is a flowchart illustrating an example process for detecting and correcting a position of an optical filter in an A/V device, according to various aspects of the present disclosure.

FIG. 9 is a flowchart illustrating an example process 900 for detecting and correcting an improperly positioned optical filter in an A/V device 210. The process 900, or portions thereof, may be performed by the A/V device 210, the server 224, the client device 214, 216, the hub device 202, or by any combination of these devices. However, for ease of illustration, the process 900 will be described with respect to only the A/V device 210. The process 900 will be described with respect to an embodiment in which the A/V device 210 includes an IR cut filter 106 and in which the A/V device encodes pixel information in YUV format, and thus the target color is magenta for daylight conditions or black for nighttime conditions. For ease of illustration, only the daytime scenario will be described with reference to FIG. 9. In other embodiments, the A/V device 210 may include an optical filter that filters wavelengths other than IR and/or near-IR, or the A/V device may encode pixel information in a different format, and thus the target color may be different from magenta in those embodiments.

The process 900 may include, at block 902, determining that an ambient light level has reached an ambient light threshold. The ambient light level may be based on the output of the light sensor 318, for example. The ambient light threshold may be indicative of an approximate boundary between daylight and lowlight conditions, in some embodiments. For example, the ambient light threshold may be set at a level at which daylight includes sufficient IR and near-IR light that video frames captured by the A/V device 210 may become red, pink, or magenta-tinted when the IR cut filter 106 is not in the active position.

The threshold used at block 902 may be selected according to a mode of operation of the A/V device 210. For example, in some embodiments, when the A/V device 210 is in a night or lowlight mode, the ambient light threshold may be set at an output of the light sensor 318 of five (5) lux to detect a transition from lowlight to daylight, and an ambient light level of five lux or more may be considered "reaching" the threshold. When the A/V device 210 is in a daytime mode of operation, the ambient light threshold may be set at an output of the light sensor 318 of two (2) lux to detect a transition from daylight to lowlight, and an ambient light level of two lux or fewer may be considered "reaching" the threshold.

In some embodiments, one or more additional aspects of process 900 (e.g., one or more of blocks 904, 906, 908, 910, 912, 914, and 916) may be performed in response to determining that the ambient light level is above an ambient light threshold. In some embodiments, the A/V device 210, may be configured to perform one or more additional aspects of process 900 (e.g., one or more of blocks 904, 906, 908, 910, 912, 914, and 916) each time the ambient light level moves from below the ambient light threshold to above the ambient light threshold. Accordingly, the ambient light threshold may be persistently monitored by the A/V device 210, the server 224, the client device 214, 216 or the hub device 202.

The process 900 may further include, at block 904, determining that the camera 314 of the A/V device 210 has reached automatic exposure convergence. In an embodiment, block 904 may include checking a flag stored in memory 402 that indicates that automatic exposure has converged. Automatic exposure convergence may include defining the exposure time per image frame, sensor gain, and/or additional sensor characteristics that determine the exposure of the camera 314. In some embodiments, automatic exposure convergence may include a process iteratively altering sensor characteristics and analyzing the resulting image until an acceptable image is captured, at which time the exposure settings are considered to have converged, and automatic exposure convergence may be considered to have been reached. Automatic exposure convergence may be executed by the A/V device 210 each time the camera 314 switches from daytime mode to night vision mode, or vice-versa, in some embodiments.

The process 900 may further include, at block 906, attempting to move an optical filter of the A/V device 210 from a first position to a second position. In the first position, the optical filter may be inactive and, in the second position, the optical filter may be active. For example, in the second position, the optical filter may be disposed between a lens 338 and an image sensor 336 of a camera 314 of the A/V device 210 so as to block a wavelength range of light from reaching the image sensor 336, while allowing other wavelengths of light to pass. In some embodiments, the optical filter may be an IR cut filter 106. In other embodiments, the optical filter may block another one or more ranges of wavelengths of light. In some embodiments, attempting to move the optical filter may include instructing an actuator of the optical filter to move the optical filter (e.g., to move an optical filter element of the optical filter). Such an instruction may originate from the processor 310 of the A/V device 210, from a server 224, hub device 202, or user client device 214, 216.

The process 900 may further include, at block 908, recording video by the A/V device 210. The recorded video may include one or more image frames, each image frame including a plurality of pixels defining a plurality of rows and a plurality of columns. In some embodiments, each pixel may be associated with a respective luma value and a respective two chromaticity values. For example, each pixel may be associated with a respective YUV value, where the Y component is a luma value and the U and V components are chromaticity components, as is known in the art. The remainder of this disclosure will generally address embodiments in which each pixel is associated with a respective YUV value set. It should be understood, however, that pixels may be associated with other value sets, such as respective RGB value sets, for example, and the teachings of the present disclosure may still be applied.

The process 900 may further include, at block 910, determining a quantity and/or percentage of pixels in one or more frames of the video that are a target color that is indicative of the absence of the optical filter. For example, in an embodiment in which the optical filter is a UV cut filter, block 910 may include determining a quantity and/or percentage of pixels in the image data that are red, pink, or magenta. In some embodiments, block 910 may include calculating a percentage of pixels in one or more of the frames that are the target color by dividing the quantity of target-color pixels by the total number of pixels in the frame.

An example process 1000 for performing the functionality of block 910 is described below with respect to FIG. 10.

The method 900 may further include, at block 912, determining a quantity of lines in the image data that are a target color. In various embodiments, the lines may correspond to rows of pixels and/or columns of pixels. A line may be considered to be the target color if a quantity or percentage of pixels in the line that are the target color is above a threshold. For example, such a threshold may be at least 75% of the pixels in the line. In another example, the threshold may be at least 80% of the pixels in the line. In another example, the threshold may be at least 85% of the pixels in the line. In another example, the threshold may be at least 90% of the pixels in the line.

With continued reference to FIG. 9, the process 900 may further include, at block 914, comparing the quantity or percentage of target-color pixels, and/or the quantity of target color lines, to respective thresholds. That is, there may be a pixel quantity threshold, a pixel percentage threshold, and/or a line quantity threshold. The pixel quantity threshold may be set according to the resolution of the one or more frames in the video (such that the threshold may be relatively higher for relatively-higher resolution frames, for example), according to the target color (such that the threshold may be relatively higher for colors more likely to appear in the field of view of the A/V device 210, and relatively lower for colors less likely to appear in the field of view of the A/V device 210), and/or according to additional or alternative factors. The pixel percentage threshold may be about 50% of the pixels, about 40% of the pixels, about 35% of the pixels, about 30% of the pixels, about 25% of the pixels, or another value, for example. The line quantity threshold may be three lines, four lines, five lines, or another value. One or more of the quantity of target color pixels being above the pixel quantity threshold, the percentage of target color pixels being above the pixel percentage threshold, and/or the quantity of target color lines being above the line quantity threshold may indicate that the optical filter is not in its second, active position. In some embodiments, any one of the target color pixel quantity, target color pixel percentage, or target color line quantity being above its respective threshold may indicate that the optical filter is not in its second, active position, and the A/V device 210 may conclude that the optical filter is not in its second, active position. In other embodiments, the A/V device may require that two or more of the target color pixel quantity, target color pixel percentage, or target color line quantity being above its respective threshold to conclude that the optical filter is not in its second, active position.

If the A/V device 210 determines that one or more thresholds have been exceeded at block 916, the process 900 may further include, at block 918, determining whether a predetermined number of attempts to actuate the optical filter has been reached. If the A/V device 210 determines that the predetermined number has not been reached, the process 900 may include returning to block 906 and again attempting to move the optical filter from the first position from the second position. If the A/V device 210 determines that the predetermined number of attempts has been reached, the process may end at block 920.

Returning to block 916, if the A/V device 210 does not conclude that the optical filter is not in its second, active position based on the one or more threshold comparisons, the process may end at block 920.

In some embodiments of the process 900, all pixels in an image frame may be analyzed for a quantity of pixels of the target color and included in the threshold comparison. In other embodiments, only a subset of pixels may be considered in order to expedite processing time and thereby reduce battery or other power consumption of the A/V device 210. For example, every other row of pixels may be considered, or some other subset of the total image frame. In another example, the A/V device 210 may analyze the frames of recorded video over time to determine a subset of pixels that are consistently a single color (e.g., gray pixels, and e.g., before beginning the process 900), and that subset of pixels may be analyzed for the presence of the target color in the process 900, while other pixels that are not in the subset may be ignored.

In some embodiments, block 910 may include counting a quantity (and/or determining a percentage) of pixels of the target color in a single image frame. In other embodiments, block 910 may include counting a quantity (and/or determining a percentage) of target color pixels in two or more image frames. Where two or more frames are counted at block 910, block 914 may include comparing an average of the quantity/percentage of target color pixels among the two or more frames to a single frame threshold, or comparing a summed total of the multi-frame target color pixel quantity/percentage to a multi-frame threshold, for example.

Similarly, in some embodiments, block 912 may include counting a quantity of lines of the target color in a single image frame. In other embodiments, block 912 may include counting a quantity of target color lines in two or more image frames. Where two or more frames are counted at block 912, block 914 may include comparing an average of the quantity of target color lines among the two or more frames to a single frame threshold, or comparing a summed total of the multi-frame target color lines to a multi-frame threshold, for example.

In some embodiments, the A/V device 210 may iteratively repeat blocks 906, 908, 910, 912, 914, 916, 918 until the target color pixel quantity does not exceed the threshold at block 914, or until a predetermined number of iterations has been performed. After a predetermined number of iterations has been performed with the quantity of target color pixels continuing to exceed the threshold, the A/V device 210 may conclude that the optical filter cannot be actuated. Responsive to the predetermined number of iterations being performed with the quantity of target color pixels continuing to exceed the threshold, a notification may be generated and transmitted to a user client device associated with the A/V device 210. The notification may indicate that an IR cut filter 106 or other optical filter cannot be actuated, may include instructions for the user to address an IR cut filter 106 or other optical filter that cannot be actuated, and/or may ask the user if the effects of an optical filter that cannot be actuated (e.g., a magenta-tinted image, in the example of an IR cut filter 106) are apparent to the user. If the user answers such a notification in the affirmative, a further notification including instructions for addressing the optical filter that cannot be actuated may be generated and transmitted to the user client device.

Figure 10:
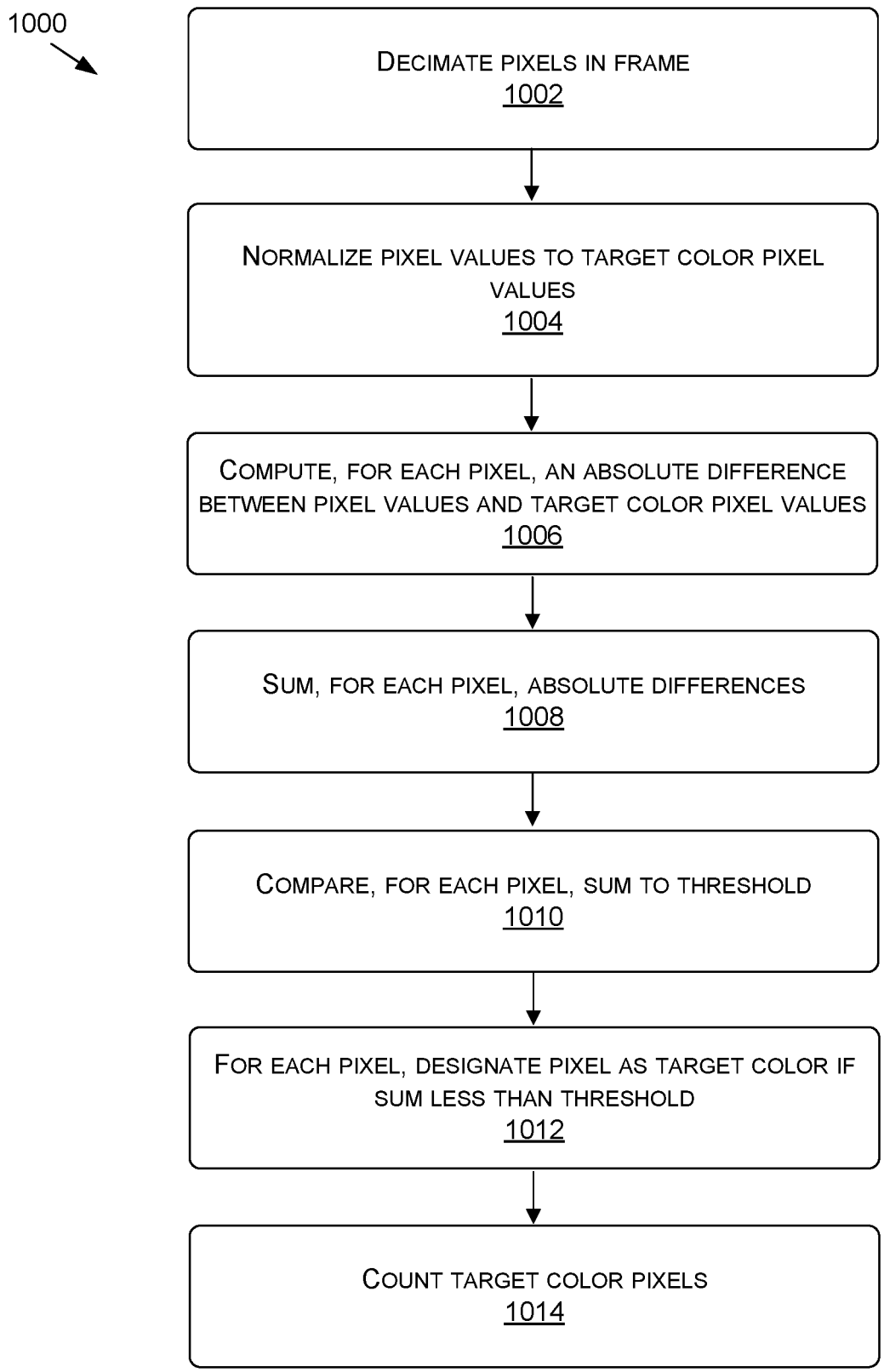
FIG. 10 is a flowchart illustrating an example process for determining a quantity of target color pixels in an image frame, according to various aspects of the present disclosure.

FIG. 10 is a flowchart illustrating an example process 1000 for determining a quantity and/or percentage of target color pixels in a frame. As noted above, the process 1000 may find use at block 910 in the process 900. The process 1000, or portions thereof, may be performed by the A/V device 210, the server 224, the client device 214, 216, the hub device 202, or by any combination of these devices. However, for ease of illustration, the process 1000 will be described with respect to only the A/V device 210.

The process 1000 will be described with respect to a single frame of a video. It should be understood, however, that the process 1000 may be performed with respect to two or more frames of a video, in embodiments, as described above with respect to block 910 of the process 900.

The process 1000 may include, at block 1002, decimating the pixels of the image frame. In some embodiments, the pixels of the image frame may be decimated to reduce the number of pixels for target color analysis. For example, in some embodiments, the pixels may be encoded in a YUV format (e.g., YUV 4:2:0) that has denser luma data than chromaticity data (e.g., data that is twice as dense across both the rows and the columns of the frame). In such embodiments, the luma data of the pixels may be decimated by a decimation factor (e.g., a factor of two for YUV 4:2:0 frames) in one dimension (e.g., across the rows or the columns of the frame) or each dimension (e.g., across both the rows and columns of the frame), such that the decimated frame includes the same dimensionality for its luma data as for its chromaticity data. In some embodiments, decimating the Y values of the frame may include removing every other Y value across both the rows and columns of an image frame, for example. In other embodiments, decimating the pixels in the frame may include otherwise reducing the number of pixels for analysis, such as by removing one or more portions of a frame, removing more or fewer pixels than every other pixel, or removing one or more rows or columns of pixels, for example.

The process 1000 may further include, at block 1004, normalizing the values of the pixels in the frame (e.g., the decimated frame, if decimated according to block 1002, or the original frame if not decimated) to the value of a pixel of the target color (which may be referred to herein as a "target pixel"). In an embodiment in which the optical filter is an IR cut filter, the values of the pixels in the frame may be normalized to a red, pink, or magenta pixel, for example. In an embodiment in which the pixels in the frame comprise a respective set of YUV values for each pixel, the respective values of the pixels in the image data may be normalized to the Y value of the pure particular target color. Accordingly, in an embodiment in which the optical filter is an IR cut filter and the image data comprises a respective set of YUV values for each pixel, the respective YUV value set of each pixel may be normalized to the Y value of a pure magenta pixel. Normalizing the YUV value set of each pixel allows for the comparison of the normalized values to the YUV value set of a pure magenta pixel in a way that offsets the effects of other colors that may be present in the pixel being analyzed.

In an example of block 1004, a pure magenta pixel may have a YUV value set of (105, 212, 234), and an example data pixel in the data set may have a YUV value set of (100, 50, 50). Normalizing the data pixel to the pure magenta pixel may include the following: (1) subtract 128 from the data pixel's U value (because, in some embodiments, the U and V values of YUV-encoded pixels are shifted up by 128 to ensure that values are positive); (2) subtract 128 from the data pixel's V value (because, in some embodiments, the U and V values of YUV-encoded pixels are shifted up by 128 to ensure that values are positive); (3) divide the data pixel's (Y, U, V) values each by the data pixel's Y value (100); (4) multiply the data pixel's (Y, U, V) values each by the pure magenta pixel's Y value (105); (6) add 128 to the data pixel's U value; and (7) add 128 to the data pixel's V value. As a result of operations (1)-(7), the data pixel's normalized (Y, U, V) value set may be (105, 49.5, 49.5).

The foregoing examples are presented in the YUV color space, but the present embodiments may also be performed in the RGB color space. For example, a pure magenta pixel may have an RGB value set of (255, 0, 255), and an example data pixel in the data set may have an RGB value set of (100, 50, 50). To normalize in RGB color space, the (R, G, B) values of the data pixel may first all be divided by the largest magnitude of that data pixel's (R, G, B) values. In the example data pixel having RGB values of (100, 50, 50), the three values may each be divided by 100, to result in (1, 0.5, 0.5). The values of the data pixel may then be multiplied by the largest value in the RGB value set of the pure target color. Where the target color is magenta, with an RGB value set of (255, 0, 255), the values of the data pixel may be multiplied by 255. In the example of the data pixel above, each of the values in (1, 0.5, 0.5) may be multiplied by 255, resulting in a normalized RGB value set of (255, 127.5, 127.5). As a result, the normalization process for a data pixel of (100, 50, 50) to be normalized to magenta, with RGB value set of (255, 0, 255), may be: ((100/100*255=255), (50/100*255=127.5), (50/100*255=127.5)).

In another example of block 1004, a pure magenta pixel may, again, have a YUV value set of (105, 212, 234), and an example data pixel in the data set may have a YUV value set of (90, 190, 215). As a result of operations (1)-(7) described above, the data pixel's normalized (Y, U, V) value set may be (105, 200.3, 229.5).

The process 1000 may further include, at block 1006, computing, for each pixel, absolute value differences between the values of the pixel (e.g., the normalized data respective of each pixel) and the values of the target color pixel. In an embodiment in which the pixel data includes YUV values for each pixel, block 1006 may include calculating the absolute difference between the Y value of the pixel and the Y value of the pure target color pixel, calculating the absolute difference between the U value of the pixel and the U value of the pure target color pixel, and calculating the absolute difference between the V value of the pixel and the V value of the pure target color pixel. In an embodiment in which the pixel values include YUV values and are normalized to the Y value of the pure color pixel, block 1006 may include calculating the absolute difference between the U value of the pixel and the U value of the pure target color pixel, and calculating the absolute difference between the V value of the pixel and the V value of the pure target color pixel.

Continuing the first example given above with respect to block 1004, given a normalized data pixel value set of (105, 49.5, 49.5) and a magenta value set of (105, 212, 234), block 1006 may include computing the absolute difference between (49.5) and (212), which absolute difference is 162.5, and the absolute difference between (49.5) and (234), which absolute difference is 184.5.

Continuing the second example given above with respect to block 1004, given a normalized data pixel value set of (105, 200.3, 229.5) and a magenta value set of (105, 212, 234), block 1006 may include computing the absolute difference between 200.3 and 212, which absolute difference is 11.7, and the absolute difference between 229.5 and 234, which absolute difference is 4.5.

The process 1000 may further include, at block 1008, summing, for each pixel, the absolute differences computed at block 1006. Again continuing the first example given above with respect to blocks 1004 and 1006, the absolute differences calculated at block 1006 ((162.5) and (184.5)) may be summed to (347). Again continuing the second example given above with respect to blocks 1004 and 1006, the absolute differences calculated at block 1006 ((11.7) and (4.5)) may be summed to (16.2).

The process 1000 may further include, at block 1010, comparing, for each pixel, the summed absolute values to a threshold. The threshold may be, in an embodiment, about 150. In another embodiment, the threshold may be a value between 140 and 160. In another embodiment, the threshold may be a value between 130 and 170. In another embodiment, the threshold may be a value between 120 and 180.

The process 1000 may further include, at block 1012, for each pixel, designating the pixel as being the target color if the sum is less than the threshold, as compared in block 1010. Again continuing the first example given above with respect to blocks 1004 and 1006, the sum of the YUV components's absolute differences is (105-105)+(212-49.5)+(234-49.5)=347. If the threshold of the summed absolute values is 150, as in the example described above with respect to block 1012, then the data pixel is determined not to be the target color (magenta) because the sum of the YUV components's absolute differences is greater than the threshold value. Again continuing the second example given above with respect to blocks 1004 and 1006, the sum of the YUV components's absolute differences is (105−105)+(212−200.3)+(234−229.5)=16.2. If the threshold of the summed absolute values is 150, as in the example described above with respect to block 1012, then the data pixel is determined to be the target color (magenta) because the sum of the YUV components's absolute differences is less than the threshold value.

The process 1000 may further include, at block 1014, counting the quantity of color pixels designated at block 1012. In some embodiments, the total quantity of target color pixels may be counted. Additionally, or alternatively, the percentage of target color pixels in the frame may be determined.

In some embodiments, as a result of the normalization of block 1004, the process 1000 (and, when the process 1000 is part of the process 900, the process 900) may be applicable in any ambient light condition, because the luma of each pixel may be normalized to the luma of a pure color pixel. As a result, the differences between the pure color pixel and each data pixel are only in chromaticity, not in brightness, and the brightness of the scene represented in the image data may not affect the accuracy of the process 1000.

Figure 11:
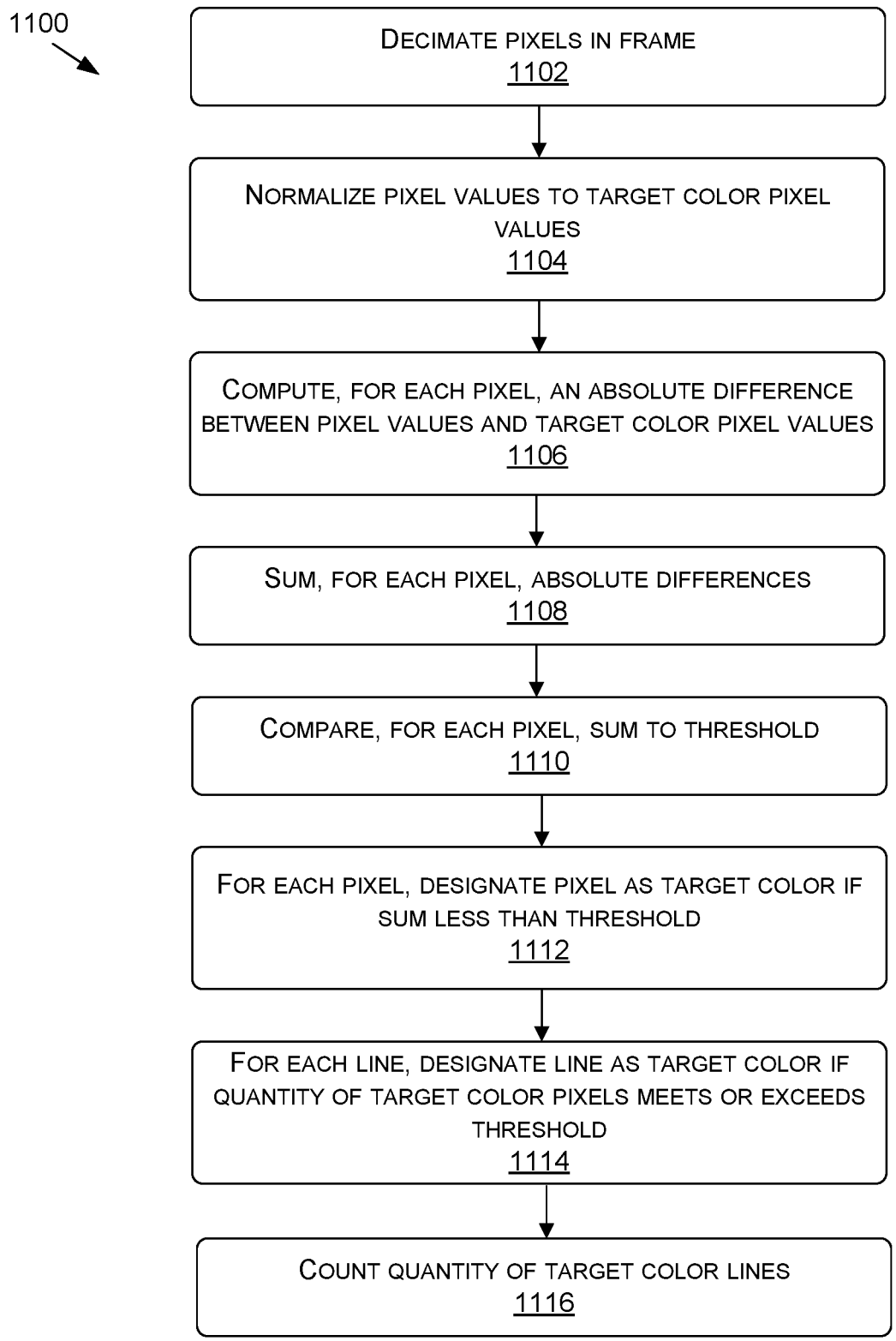
FIG. 11 is a flowchart illustrating an example process for determining a quantity of target color lines in an image frame, according to various aspects of the present disclosure.

FIG. 11 is a flowchart illustrating an example process 1100 for determining a quantity of target color lines in a frame. As noted above, the process 1100 may find use at block 912 in the process 900. The process 1100, or portions thereof, may be performed by the A/V device 210, the server 224, the client device 214, 216, the hub device 202, or by any combination of these devices. However, for ease of illustration, the process 1100 will be described with respect to only the A/V device 210.

The process 1100 will be described with respect to a single frame of a video. It should be understood, however, that the process 1100 may be performed with respect to two or more frames of a video, in embodiments, as described above with respect to block 912 of process 900.

The process 1100 may include, at block 1102, decimating the pixels of the image frame. Block 1102 may be substantially similar to or the same as block 1002, in some embodiments.

The process 1000 may further include, at block 1004, normalizing the values of the pixels in the frame (e.g., the decimated frame, if decimated according to block 1102, or the original frame if not decimated) to the value of a pixel of the target color. Block 1104 may be substantially similar to or the same as block 1004, in some embodiments.

The process 1000 may further include, at block 1006, computing, for each pixel, absolute value differences between the values of the pixel (e.g., the normalized data respective of each pixel) and the values of the target color pixel. Block 1106 may be substantially similar to or the same as block 1006, in some embodiments.

The process 1000 may further include, at block 1108, summing, for each pixel, the absolute differences computed at block 1106. Block 1108 may be substantially similar to or the same as block 1008, in some embodiments.

The process 1000 may further include, at block 1110, comparing, for each pixel, the summed absolute values to a threshold. Block 1110 may be substantially similar to or the same as block 1010, in some embodiments.

The process 1000 may further include, at block 1112, for each pixel, designating the pixel as being the target color if the sum is less than the threshold, as compared in block 1110. Block 1112 may be substantially similar to or the same as block 1012, in some embodiments.

The process 1100 may further include, at block 1114, for each line in the frame, designating the line as the target color if the quantity of target color pixels meets or exceeds a threshold. The threshold may be 75% of the pixels in the line, 80% of the pixels in the line, 85% of the pixels, 90% of the pixels in the line, or another appropriate threshold. A line may be a row or a column of the frame, for example.

The process 1000 may further include, at block 1116, counting the quantity of target color lines (e.g., rows and/or columns) designated at block 1114. In some embodiments, once a threshold quantity of lines have been designated as the target color, the process 1100 may terminate, to conserve processing time and power consumption of the A/V device 210.

In some embodiments, as a result of the normalization of block 1104, the process 1100 (and, when the process 1100 is part of the process 900, the process 900) may be applicable in any ambient light condition, because the luma of each pixel may be normalized to the luma of a pure color pixel. As a result, the differences between the pure color pixel and each data pixel are only in chromaticity, not in brightness, and the brightness of the scene represented in the image data may not affect the accuracy of the process 1100.

The processes 900, 1000, in conjunction with the A/V device 210, the server 224, the client device 214, 216 and/or the hub device 202, may provide an improved approach for determining whether an optical filter is in a desired position in the A/V device 210 without the requirement of a position sensor on the optical filter.

Figure 12:
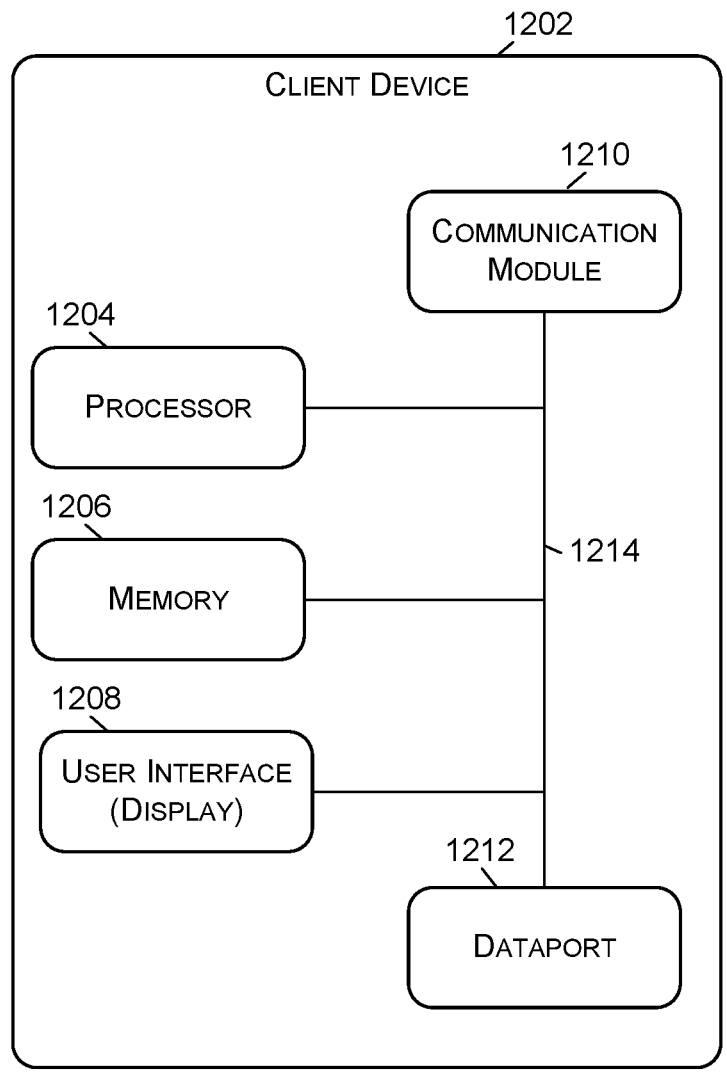
FIG. 12 is a functional block diagram of a client device on which the present embodiments may be implemented according to various aspects of the present disclosure.

FIG. 12 is a functional block diagram of a client device 1202 on which the present embodiments may be implemented according to various aspects of the present disclosure. The client device(s) 214, 216 described with reference to FIG. 2 may include some or all of the components and/or functionality of the client device 1202. The client device 1202 may comprise, for example, a smartphone.

With reference to FIG. 12, the client device 1202 includes a processor 1204, a memory 1206, a user interface 1208, a communication module 1210, and a dataport 1212. These components are communicatively coupled together by an interconnect bus 1214. The processor 1204 may include any processor used in smartphones and/or portable computing devices, such as an ARM processor (a processor based on the RISC (reduced instruction set computer) architecture developed by Advanced RISC Machines (ARM).). In some embodiments, the processor 1204 may include one or more other processors, such as one or more conventional microprocessors, and/or one or more supplementary co-processors, such as math co-processors.

The memory 1206 may include both operating memory, such as random-access memory (RAM), as well as data storage, such as read-only memory (ROM), hard drives, flash memory, or any other suitable memory/storage element. The memory 1206 may include removable memory elements, such as a CompactFlash card, a MultiMediaCard (MMC), and/or a Secure Digital (SD) card. In some embodiments, the memory 1206 may comprise a combination of magnetic, optical, and/or semiconductor memory, and may include, for example, RAM, ROM, flash drive, and/or a hard disk or drive. The processor 1204 and the memory 1206 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1204 may be connected to the memory 1206 via the dataport 1212.

The user interface 1208 may include any user interface or presentation elements suitable for a smartphone and/or a portable computing device, such as a keypad, a display screen, a touchscreen, a microphone, and a speaker. The communication module 1210 is configured to handle communication links between the client device 1202 and other, external devices or receivers, and to route incoming/outgoing data appropriately. For example, inbound data from the dataport 1212 may be routed through the communication module 1210 before being directed to the processor 1204, and outbound data from the processor 1204 may be routed through the communication module 1210 before being directed to the dataport 1212. The communication module 1210 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1212 may be any type of connector used for physically interfacing with a smartphone and/or a portable computing device, such as a mini-USB port or an IPHONE®/IPOD® 30-pin connector or LIGHTNING® connector. In other embodiments, the dataport 1212 may include multiple communication channels for simultaneous communication with, for example, other processors, servers, and/or client terminals.

The memory 1206 may store instructions for communicating with other systems, such as a computer. The memory 1206 may store, for example, a program (e.g., computer program code) adapted to direct the processor 1204 in accordance with the present embodiments. The instructions also may include program elements, such as an operating system. While execution of sequences of instructions in the program causes the processor 1204 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 13:
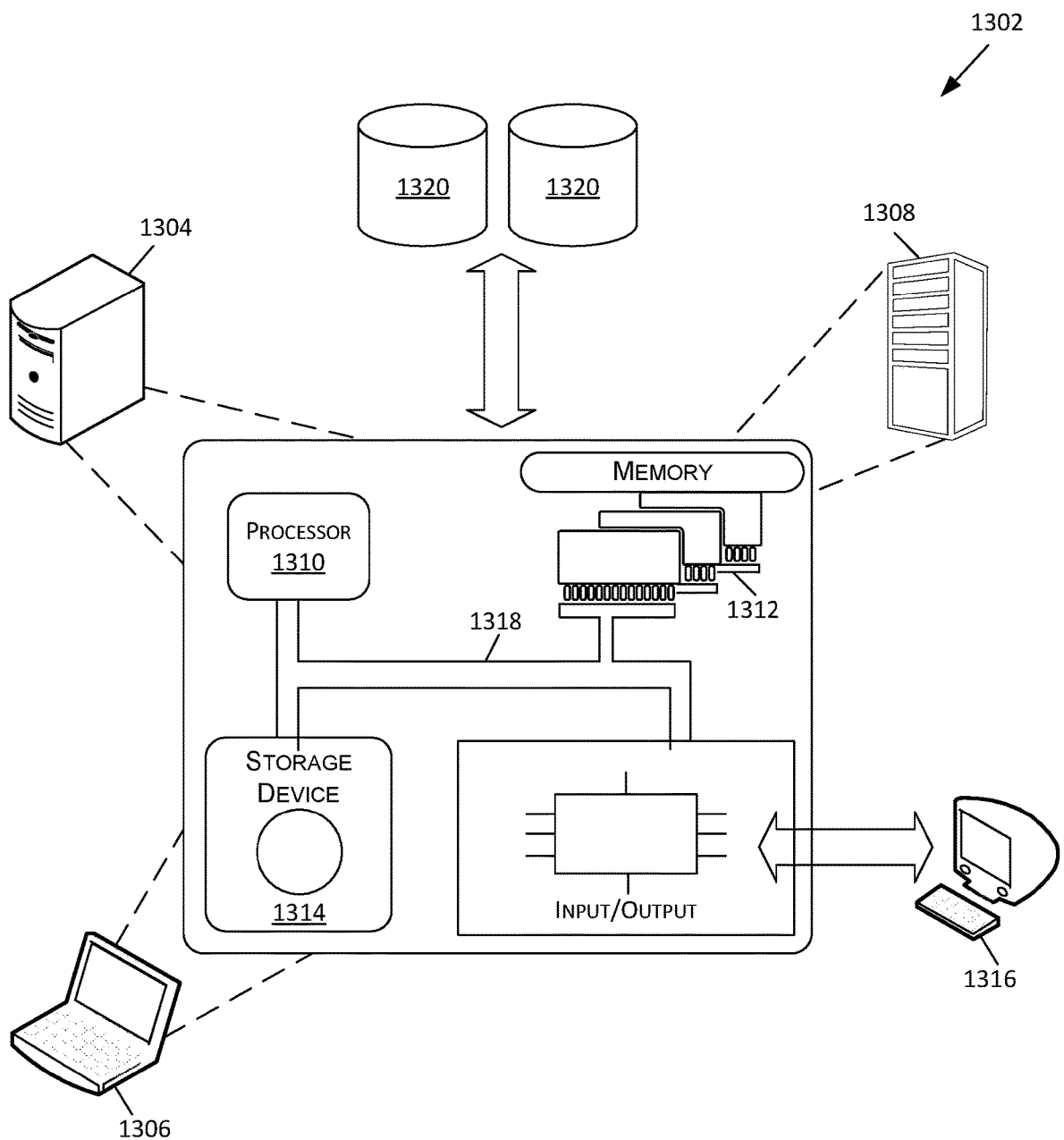
FIG. 13 is a functional block diagram of a general-purpose computing system on which the present embodiments may be implemented according to various aspects of present disclosure.

FIG. 13 is a functional block diagram of a general-purpose computing system on which the present embodiments may be implemented according to various aspects of the present disclosure. The computer system 1302 may be embodied in at least one of a personal computer (also referred to as a desktop computer) 1304, a portable computer (also referred to as a laptop or notebook computer) 1306, and/or a server 1308 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1302 may execute at least some of the operations described above. The computer system 1302 may include at least one processor 1310, memory 1312, at least one storage device 1314, and input/output (I/O) devices 1316. Some or all of the components 1310, 1312, 1314, 1316 may be interconnected via a system bus 1318. The processor 1310 may be single- or multi-threaded and may have one or more cores. The processor 1310 execute instructions, such as those stored in the memory 1312 and/or in the storage device 1314. Information may be received and output using one or more I/O devices 1316.

The memory 1312 may store information, and may be a computer-readable medium, such as volatile or non-volatile memory. The storage device(s) 1314 may provide storage for the system 1302 and, in some embodiments, may be a computer-readable medium. In various aspects, the storage device(s) 1314 may be a flash memory device, a hard disk device, an optical disk device, a tape device, or any other type of storage device.

The I/O devices 1316 may provide input/output operations for the system 102. The I/O devices 1316 may include a keyboard, a pointing device, and/or a microphone. The I/O devices 1316 may further include a display unit for displaying graphical user interfaces, a speaker, and/or a printer. External data may be stored in one or more accessible external databases 1320.

In a first aspect of the present disclosure, an example camera device is disclosed. The example camera device includes a camera including an image sensor, an infrared (IR) cut filter configured to block IR light, and an actuator configured to actuate the IR cut filter from a first position in which the IR cut filter is not located before the image sensor of the camera to a second position in which the IR cut filter is located before the image sensor of the camera. The example camera device further includes a processor and a non-transitory computer-readable memory storing instructions that, when executed by the processor, cause the processor to: determine that an ambient light level is above a threshold light level; send, to the actuator for the IR cut filter of the camera device, an instruction to move the IR cut filter from the first position to the second position; record, using the camera of the camera device, video comprising a plurality of frames, each of the frames having a plurality of lines of pixels, each of the frames having a total number of pixels; perform at least one of: (a) for each frame in a subset of the plurality of frames, determine a quantity of pixels, or a percentage of the total number of pixels, in the frame(s) that are magenta, and determine that the quantity of pixels, or the percentage of the total number of pixels, in one or more of the frames in the subset of the plurality of frames that are magenta is greater than a first threshold value; or (b) for each frame in the subset of the plurality of frames, determine a quantity of the lines of pixels in the frame(s) that are magenta, and determine that the quantity of the lines of pixels in the frame(s) that are magenta is greater than a second threshold value; and after performing at least one of (a) or (b), again send, to the actuator for the IR cut filter of the camera device, an instruction to move the IR cut filter from the first position to the second position.

In an example embodiment of the first aspect, each of the pixels has respective pixel values comprising a respective luma value, a respective first chromaticity component value, and a respective second chromaticity component value, determining a quantity of pixels, or a percentage of the total number of pixels, in the frame(s) that are magenta includes, for each of a plurality of pixels in the frame(s): computing a first absolute difference between the first chromaticity value of the pixel and the first chromaticity value of magenta; computing a second absolute difference between the second chromaticity value of the pixel and the second chromaticity value of magenta; summing the first and second absolute differences to generate an absolute difference sum; and determining that the absolute difference sum is less than a chromaticity difference threshold and designating the pixel as magenta; and determining a quantity of the lines of pixels in the frame(s) that are magenta comprises, for each of a plurality of lines in the frame(s): for each of a plurality of pixels in the line: computing a first absolute difference between the first chromaticity value of the pixel and the first chromaticity value of magenta; computing a second absolute difference between the second chromaticity value of the pixel and the second chromaticity value of magenta; summing the first and second absolute differences to generate an absolute difference sum; and determining that the absolute difference sum is less than a chromaticity difference threshold and designating the pixel as magenta; summing a quantity of pixels in the line designated as magenta; and determining that the quantity of pixels in the line designated as magenta exceeds a line threshold and designating the line as magenta.

In a second aspect of the present disclosure, an example method for a camera device is provided. The method includes (i) sending, to an optical filter actuator of the camera device, an instruction to move an optical filter of the camera device from a first position in which the optical filter is not located before an image sensor of the camera device to a second position in which the optical filter is located before the image sensor of the camera device, (ii) recording, using a camera of the camera device, video comprising a plurality of frames, each of the frames having a plurality of lines of pixels, each of the frames having a total number of pixels, each of the pixels having respective pixel values, (iii) performing at least one of: (a) for each frame in a subset of the plurality of frames, determining a quantity of pixels, or a percentage of the total number of pixels, in the frame(s) that have pixel values for which a sum of absolute differences between the pixel values and corresponding component pixel values of a target pixel is less than a first threshold value, and determining that the quantity of pixels, or the percentage of the total number of pixels, in one or more of the frames in the subset of the plurality of frames that have pixel values for which a sum of absolute differences between the pixel values and corresponding component pixel values of the target pixel is less than the first threshold value is greater than a second threshold value; or (b) for each frame in the subset of the plurality of frames, determining a quantity of the lines of pixels in the frame(s) for which at least a third threshold value of pixels have pixel values for which a sum of absolute differences between the pixel values and corresponding component pixel values of the target pixel is less than the first threshold value, and determining that the quantity of the lines of pixels in the frame(s) for which at least the third threshold value of pixels have pixel values for which a sum of absolute differences between the pixel values and corresponding component pixel values of the target pixel is less than the first threshold value is greater than a fourth threshold value, and (iv) after performing at least one of (a) or (b), again sending, to the optical filter actuator of the camera device, an instruction to move the optical filter from the first position to the second position.

In an example embodiment of the second aspect, the method includes performing (b), and the third threshold value is 90% or more of the pixels in the line.

In an example embodiment of the second aspect, the optical filter is an infrared filter, and the target pixel is magenta.

In an example embodiment of the second aspect, the respective pixel values for each pixel comprise a respective luma value, a respective first chromaticity component value, and a respective second chromaticity component value, and the method further includes, before (iii), normalizing the respective luma value, respective first chromaticity component value, and respective second chromaticity component value of each pixel to a luma value of the target pixel. In a further example, of the second aspect, the method further includes, before (iii), decimating the luma values of the plurality of pixels by a row decimation factor across the rows of the image frame and decimating the luma values of the plurality of pixels by a column decimation factor across the columns of the image frame.

In an example embodiment of the second aspect, the respective pixel values for each pixel comprise a respective luma value, a respective first chromaticity component value, and a respective second chromaticity component value, and determining a quantity of pixels, or a percentage of the total number of pixels, in the frame(s) that have pixel values for which a sum of absolute differences between the pixel values and corresponding component pixel values of a target pixel is less than a first threshold value includes, for each pixel in the frame(s): computing a first absolute difference between the first chromaticity value of the pixel and the first chromaticity value of the target pixel; computing a second absolute difference between the second chromaticity value of the pixel and the second chromaticity value of the target pixel; summing the first and second absolute differences to generate an absolute difference sum; and comparing the absolute difference sum to the first threshold, and determining a quantity of the lines of pixels in the frame(s) for which at least a third threshold value of pixels have pixel values for which a sum of absolute differences between the pixel values and corresponding component pixel values of the target pixel is less than the first threshold value comprises, for each pixel in the frame(s): computing a first absolute difference between the first chromaticity value of the pixel and the first chromaticity value of the target pixel; computing a second absolute difference between the second chromaticity value of the pixel and the second chromaticity value of the target pixel; summing the first and second absolute differences to generate an absolute difference sum; and comparing the absolute difference sum to the first threshold.

In an example embodiment of the second aspect, the method further includes, before (iii), determining an ambient light level is above a threshold light level, and determining that the camera has reached automatic exposure convergence.

In an example embodiment of the second aspect the method further includes repeating, a predetermined number of times, the (i), (ii), and (iii), and after the predetermined number of times, causing a notification to be transmitted to a client device associated with the camera device that the optical filter has not been properly actuated.

In an example embodiment of the second aspect, the subset of the plurality of frames includes two or more frames, wherein determining that the quantity of pixels, or the percentage of the total number of pixels, in one or more of the frames in the subset of the plurality of frames that have pixel values for which a sum of absolute differences between the pixel values and corresponding component pixel values of the target pixel is less than the first threshold value is greater than a second threshold value includes at least one of: determining that a sum of the quantities of pixels in two or more frames in the subset of the plurality of frames that have pixel values for which a sum of absolute differences between the pixel values and corresponding component pixel values of the target pixel is less than the first threshold value is greater than the second threshold value, wherein the second threshold value is a multi-frame threshold; or determining that an average of the quantities of pixels in two or more frames in the subset of the plurality of frames that have pixel values for which a sum of absolute differences between the pixel values and corresponding component pixel values of the target pixel is less than the first threshold value is greater than the second threshold value, wherein the second threshold value is a single-frame threshold, or determining that the quantity of the lines of pixels in the frame(s) for which at least the third threshold value of pixels have pixel values for which a sum of absolute differences between the pixel values and corresponding component pixel values of the target pixel is less than the first threshold value is greater than a fourth threshold value includes at least one of: determining that a sum of the quantities of the lines of pixels in the frame(s) for which at least the third threshold value of pixels have pixel values for which a sum of absolute differences between the pixel values and corresponding component pixel values of the target pixel is less than the first threshold value is greater than the fourth threshold value, wherein the fourth threshold value is a multi-frame threshold; or determining that an average of the quantities of the lines of pixels in the frame(s) for which at least the third threshold value of pixels have pixel values for which a sum of absolute differences between the pixel values and corresponding component pixel values of the target pixel is less than the first threshold value is greater than the fourth threshold value, wherein the fourth threshold value is a single-frame threshold.

In a third aspect of the present disclosure, an example camera device is provided. The example camera device includes a camera having an image sensor, an optical filter, and an actuator for the optical filter. The example camera device further includes a processor and a non-transitory computer-readable memory storing instructions that, when executed by the processor, cause the camera device to: (i) send, to the actuator for the optical filter of the camera, an instruction to move the optical filter of the camera from a first position in which the optical filter is not located before the image sensor of the camera to a second position in which the optical filter is located before the image sensor of the camera; (ii) record, using the camera of the camera device, video comprising a plurality of frames, each of the frames having a plurality of lines of pixels, each of the pixels having respective pixel values; (iii) for each frame in the subset of the plurality of frames, determine a quantity of the lines of pixels in the frame(s) for which at least a first threshold value of pixels have pixel values for which a sum of absolute differences between the pixel values and corresponding component pixel values of the target pixel is less than a second threshold value, and determine that the quantity of the lines of pixels in the frame(s) for which at least the first threshold value of pixels have pixel values for which a sum of absolute differences between the pixel values and corresponding component pixel values of the target pixel is less than the second threshold value is greater than a third threshold value; and (iv) after performing (iii), again send, to the actuator for the optical filter of the camera device, an instruction to move the optical filter from the first position to the second position.

In an example embodiment of the third aspect, the first threshold value is 90% or more of the pixels in the line.

In an example embodiment of the third aspect, the optical filter is an infrared filter, and the target pixel is magenta.

In an example embodiment of the third aspect, the respective pixel values for each pixel comprises a respective luma value, a respective first chromaticity component value, and a respective second chromaticity component value, and the non-transitory computer-readable memory stores further instructions that, when executed by the processor, cause the camera device to, before performing (iii), normalize the respective luma value, respective first chromaticity component value, and respective second chromaticity component value of each pixel to a luma value of the target pixel.

In an example embodiment of the third aspect, the non-transitory computer-readable memory stores further instructions that, when executed by the processor, cause the camera device to, before performing (iii), decimate the luma values of the plurality of pixels by a row decimation factor across the rows of the image frame and decimating the luma values of the plurality of pixels by a column decimation factor across the columns of the image frame.

In an example embodiment of the third aspect, the respective pixel values for each pixel comprises a respective luma value, a respective first chromaticity component value, and a respective second chromaticity component value, and determining a quantity of the lines of pixels in the frame(s) for which at least a first threshold value of pixels have pixel values for which a sum of absolute differences between the pixel values and corresponding component pixel values of the target pixel is less than the second threshold value comprises, for each pixel in the frame(s): computing a first absolute difference between the first chromaticity value of the pixel and the first chromaticity value of the target pixel; computing a second absolute difference between the second chromaticity value of the pixel and the second chromaticity value of the target pixel; summing the first and second absolute differences to generate an absolute difference sum; and comparing the absolute difference sum to the second threshold value.

In an example embodiment of the third aspect, the non-transitory computer-readable memory stores further instructions that, when executed by the processor, cause the camera device to, before performing (iii), determine an ambient light level is above a threshold light level, and determine that the camera has reached automatic exposure convergence.

In an example embodiment of the third aspect, the non-transitory computer-readable memory stores further instructions that, when executed by the processor, cause the camera device to repeat, a predetermined number of times, the sending, recording, and performing, and after the predetermined number of times, cause a notification to be transmitted to a client device associated with the camera device that the optical filter has not been properly actuated.

In an example embodiment of the third aspect, the subset of the plurality of frames includes two or more frames, and determining that the quantity of the lines of pixels in the frame(s) for which at least the first threshold value of pixels have pixel values for which a sum of absolute differences between the pixel values and corresponding component pixel values of the target pixel is less than the second threshold value is greater than a third threshold value comprises at least one of: determining that a sum of the quantities of the lines of pixels in the frame(s) for which at least the first threshold value of pixels have pixel values for which a sum of absolute differences between the pixel values and corresponding component pixel values of the target pixel is less than the second threshold value is greater than the third threshold value, wherein the third threshold value is a multi-frame threshold; or determining that an average of the quantities of the lines of pixels in the frame(s) for which at least the first threshold value of pixels have pixel values for which a sum of absolute differences between the pixel values and corresponding component pixel values of the target pixel is less than the second threshold value is greater than the third threshold value, wherein the third threshold value is a single-frame threshold.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A camera device comprising:
    a camera comprising:
        an image sensor;
        an infrared (IR) cut filter configured to block IR light; and
        an actuator configured to actuate the IR cut filter from a first position in which the IR cut filter is not located before the image sensor of the camera to a second position in which the IR cut filter is located before the image sensor of the camera;
    a processor; and
    a non-transitory computer-readable memory storing instructions that, when executed by the processor, cause the processor to:
        determine that an ambient light level is above a threshold light level;
        send, to the actuator for the IR cut filter of the camera device, an instruction to move the IR cut filter from the first position to the second position;
        record, using the camera of the camera device, video comprising a plurality of frames, each of the frames having a plurality of lines of pixels, each of the frames having a total number of pixels;
        perform at least one of:
            (a) for each frame in a subset of the plurality of frames, determine a quantity of pixels, or a percentage of the total number of pixels, in the frame(s) that are magenta, and determine that the quantity of pixels, or the percentage of the total number of pixels, in one or more of the frames in the subset of the plurality of frames that are magenta is greater than a first threshold value; or
            (b) for each frame in the subset of the plurality of frames, determine a quantity of the lines of pixels in the frame(s) that are magenta, and determine that the quantity of the lines of pixels in the frame(s) that are magenta is greater than a second threshold value; and
        after performing at least one of (a) or (b), again send, to the actuator for the IR cut filter of the camera device, an instruction to move the IR cut filter from the first position to the second position.

2. The camera device of claim 1, wherein each of the pixels has respective pixel values comprising a respective luma value, a respective first chromaticity component value, and a respective second chromaticity component value, further wherein:
    determining a quantity of pixels, or a percentage of the total number of pixels, in the frame(s) that are magenta comprises, for each of a plurality of pixels in the frame(s):
        computing a first absolute difference between the first chromaticity value of the pixel and the first chromaticity value of magenta;
        computing a second absolute difference between the second chromaticity value of the pixel and the second chromaticity value of magenta;
        summing the first and second absolute differences to generate an absolute difference sum; and
        determining that the absolute difference sum is less than a chromaticity difference threshold and designating the pixel as magenta; and determining a quantity of the lines of pixels in the frame(s) that are magenta comprises, for each of a plurality of lines in the frame(s):
for each of a plurality of pixels in the line:
computing a first absolute difference between the first chromaticity value of the pixel and the first chromaticity value of magenta;
computing a second absolute difference between the second chromaticity value of the pixel and the second chromaticity value of magenta;
summing the first and second absolute differences to generate an absolute difference sum; and
determining that the absolute difference sum is less than a chromaticity difference threshold and designating the pixel as magenta;
summing a quantity of pixels in the line designated as magenta; and
determining that the quantity of pixels in the line designated as magenta exceeds a line threshold and designating the line as magenta.

3. A method for a camera device, the method comprising:
(i) sending, to an optical filter actuator of the camera device, an instruction to move an optical filter of the camera device from a first position in which the optical filter is not located before an image sensor of the camera device to a second position in which the optical filter is located before the image sensor of the camera device;
(ii) recording, using a camera of the camera device, video comprising a plurality of frames, each of the frames having a plurality of lines of pixels, each of the frames having a total number of pixels, each of the pixels having respective pixel values;
(iii) performing at least one of:
(a) for each frame in a subset of the plurality of frames, determining a quantity of pixels, or a percentage of the total number of pixels, in the frame(s) that have pixel values for which a sum of absolute differences between the pixel values and corresponding component pixel values of a target pixel is less than a first threshold value, and determining that the quantity of pixels, or the percentage of the total number of pixels, in one or more of the frames in the subset of the plurality of frames that have pixel values for which a sum of absolute differences between the pixel values and corresponding component pixel values of the target pixel is less than the first threshold value is greater than a second threshold value; or
(b) for each frame in the subset of the plurality of frames, determining a quantity of the lines of pixels in the frame(s) for which at least a third threshold value of pixels have pixel values for which a sum of absolute differences between the pixel values and corresponding component pixel values of the target pixel is less than the first threshold value, and determining that the quantity of the lines of pixels in the frame(s) for which at least the third threshold value of pixels have pixel values for which a sum of absolute differences between the pixel values and corresponding component pixel values of the target pixel is less than the first threshold value is greater than a fourth threshold value; and
(iv) after performing at least one of (a) or (b), again sending, to the optical filter actuator of the camera device, an instruction to move the optical filter from the first position to the second position.

4. The method of claim 3, comprising performing (b), further wherein the third threshold value is 90% or more of the pixels in the line.

5. The method of claim 3, wherein:
the optical filter is an infrared filter; and
the target pixel is magenta.

6. The method of claim 3, wherein the respective pixel values for each pixel comprise a respective luma value, a respective first chromaticity component value, and a respective second chromaticity component value, wherein the method further comprises:
before (iii), normalizing the respective luma value, respective first chromaticity component value, and respective second chromaticity component value of each pixel to a luma value of the target pixel.

7. The method of claim 6, further comprising:
before (iii), decimating the luma values of the plurality of pixels by a row decimation factor across the rows of the image frame and decimating the luma values of the plurality of pixels by a column decimation factor across the columns of the image frame.

8. The method of claim 3, wherein the respective pixel values for each pixel comprise a respective luma value, a respective first chromaticity component value, and a respective second chromaticity component value, further wherein:
determining a quantity of pixels, or a percentage of the total number of pixels, in the frame(s) that have pixel values for which a sum of absolute differences between the pixel values and corresponding component pixel values of a target pixel is less than a first threshold value comprises, for each pixel in the frame(s):
computing a first absolute difference between the first chromaticity value of the pixel and the first chromaticity value of the target pixel;
computing a second absolute difference between the second chromaticity value of the pixel and the second chromaticity value of the target pixel;
summing the first and second absolute differences to generate an absolute difference sum; and
comparing the absolute difference sum to the first threshold; and
determining a quantity of the lines of pixels in the frame(s) for which at least a third threshold value of pixels have pixel values for which a sum of absolute differences between the pixel values and corresponding component pixel values of the target pixel is less than the first threshold value comprises, for each pixel in the frame(s):
computing a first absolute difference between the first chromaticity value of the pixel and the first chromaticity value of the target pixel;
computing a second absolute difference between the second chromaticity value of the pixel and the second chromaticity value of the target pixel;
summing the first and second absolute differences to generate an absolute difference sum; and
comparing the absolute difference sum to the first threshold.

9. The method of claim 3, further comprising, before (iii):
determining that an ambient light level is above a threshold light level; and
determining that the camera has reached automatic exposure convergence.

10. The method of claim 3, further comprising:
repeating, a predetermined number of times, the (i), (ii), and (iii); and after the predetermined number of times, causing a notification to be transmitted to a client device associated with the camera device that the optical filter has not been properly actuated.

11. The method of claim 3, wherein the subset of the plurality of frames comprises two or more frames, wherein:
determining that the quantity of pixels, or the percentage of the total number of pixels, in one or more of the frames in the subset of the plurality of frames that have pixel values for which a sum of absolute differences between the pixel values and corresponding component pixel values of the target pixel is less than the first threshold value is greater than a second threshold value comprises at least one of:
determining that a sum of the quantities of pixels in two or more frames in the subset of the plurality of frames that have pixel values for which a sum of absolute differences between the pixel values and corresponding component pixel values of the target pixel is less than the first threshold value is greater than the second threshold value, wherein the second threshold value is a multi-frame threshold; or
determining that an average of the quantities of pixels in two or more frames in the subset of the plurality of frames that have pixel values for which a sum of absolute differences between the pixel values and corresponding component pixel values of the target pixel is less than the first threshold value is greater than the second threshold value, wherein the second threshold value is a single-frame threshold; or
determining that the quantity of the lines of pixels in the frame(s) for which at least the third threshold value of pixels have pixel values for which a sum of absolute differences between the pixel values and corresponding component pixel values of the target pixel is less than the first threshold value is greater than a fourth threshold value comprises at least one of:
determining that a sum of the quantities of the lines of pixels in the frame(s) for which at least the third threshold value of pixels have pixel values for which a sum of absolute differences between the pixel values and corresponding component pixel values of the target pixel is less than the first threshold value is greater than the fourth threshold value, wherein the fourth threshold value is a multi-frame threshold; or
determining that an average of the quantities of the lines of pixels in the frame(s) for which at least the third threshold value of pixels have pixel values for which a sum of absolute differences between the pixel values and corresponding component pixel values of the target pixel is less than the first threshold value is greater than the fourth threshold value, wherein the fourth threshold value is a single-frame threshold.

12. A camera device, comprising:
a camera having:
an image sensor;
an optical filter; and
an actuator for the optical filter;
a processor; and
a non-transitory computer-readable memory storing instructions that, when executed by the processor, cause the camera device to:
(i) send, to the actuator for the optical filter of the camera, an instruction to move the optical filter of the camera from a first position in which the optical filter is not located before the image sensor of the camera to a second position in which the optical filter is located before the image sensor of the camera;
(ii) record, using the camera of the camera device, video comprising a plurality of frames, each of the frames having a plurality of lines of pixels, each of the pixels having respective pixel values;
(iii) for each frame in a subset of the plurality of frames, determine a quantity of the lines of pixels in the frame(s) for which at least a first threshold value of pixels have pixel values for which a sum of absolute differences between the pixel values and corresponding component pixel values of the target pixel is less than a second threshold value, and determine that the quantity of the lines of pixels in the frame(s) for which at least the first threshold value of pixels have pixel values for which a sum of absolute differences between the pixel values and corresponding component pixel values of the target pixel is less than the second threshold value is greater than a third threshold value; and
(iv) after performing (iii), again send, to the actuator for the optical filter of the camera device, an instruction to move the optical filter from the first position to the second position.

13. The camera device of claim 12, wherein the first threshold value is 90% or more of the pixels in the line.

14. The camera device of claim 12, wherein:
the optical filter is an infrared filter; and
the target pixel is magenta.

15. The camera device of claim 12, wherein the respective pixel values for each pixel comprises a respective luma value, a respective first chromaticity component value, and a respective second chromaticity component value, wherein the non-transitory computer-readable memory stores further instructions that, when executed by the processor, cause the camera device to:
before performing (iii), normalize the respective luma value, respective first chromaticity component value, and respective second chromaticity component value of each pixel to a luma value of the target pixel.

16. The camera device of claim 15, wherein the non-transitory computer-readable memory stores further instructions that, when executed by the processor, cause the camera device to:
before performing (iii), decimate the luma values of the plurality of pixels by a row decimation factor across the rows of the image frame and decimating the luma values of the plurality of pixels by a column decimation factor across the columns of the image frame.

17. The camera device of claim 12, wherein the respective pixel values for each pixel comprises a respective luma value, a respective first chromaticity component value, and a respective second chromaticity component value, further wherein:
determining a quantity of the lines of pixels in the frame(s) for which at least a first threshold value of pixels have pixel values for which a sum of absolute differences between the pixel values and corresponding component pixel values of the target pixel is less than the second threshold value comprises, for each pixel in the frame(s):
computing a first absolute difference between the first chromaticity value of the pixel and the first chromaticity value of the target pixel;

computing a second absolute difference between the second chromaticity value of the pixel and the second chromaticity value of the target pixel;

summing the first and second absolute differences to generate an absolute difference sum; and comparing the absolute difference sum to the second threshold value.

18. The camera device of claim 12, wherein the non-transitory computer-readable memory stores further instructions that, when executed by the processor, cause the camera device to, before performing (iii):

determine that an ambient light level is above a threshold light level; and determine that the camera has reached automatic exposure convergence.

19. The camera device of claim 12, wherein the non-transitory computer-readable memory stores further instructions that, when executed by the processor, cause the camera device to:

repeat, a predetermined number of times, the sending, recording, and performing; and after the predetermined number of times, cause a notification to be transmitted to a client device associated with the camera device that the optical filter has not been properly actuated.

20. The camera device of claim 12, wherein the subset of the plurality of frames comprises two or more frames, wherein:

determining that the quantity of the lines of pixels in the frame(s) for which at least the first threshold value of pixels have pixel values for which a sum of absolute differences between the pixel values and corresponding component pixel values of the target pixel is less than the second threshold value is greater than a third threshold value comprises at least one of:

determining that a sum of the quantities of the lines of pixels in the frame(s) for which at least the first threshold value of pixels have pixel values for which a sum of absolute differences between the pixel values and corresponding component pixel values of the target pixel is less than the second threshold value is greater than the third threshold value, wherein the third threshold value is a multi-frame threshold; or determining that an average of the quantities of the lines of pixels in the frame(s) for which at least the first threshold value of pixels have pixel values for which a sum of absolute differences between the pixel values and corresponding component pixel values of the target pixel is less than the second threshold value is greater than the third threshold value, wherein the third threshold value is a single-frame threshold.

* * * * *